(12) United States Patent
Hiew et al.

(10) Patent No.: US 7,110,936 B2
(45) Date of Patent: Sep. 19, 2006

(54) SYSTEM AND METHOD FOR GENERATING AND MAINTAINING SOFTWARE CODE

(75) Inventors: Fen Hiew, Mendota Heights, MN (US); Edwin M. Schroeder, Chicago, IL (US)

(73) Assignee: Complementsoft LLC, Chicago, IL (US)

( * ) Notice: Subject to any disclaimer, the term of this patent is extended or adjusted under 35 U.S.C. 154(b) by 923 days.

(21) Appl. No.: 09/992,624

(22) Filed: Nov. 19, 2001

(65) Prior Publication Data

US 2005/0229154 A1 Oct. 13, 2005

Related U.S. Application Data

(60) Provisional application No. 60/270,950, filed on Feb. 23, 2001, provisional application No. 60/293,854, filed on May 25, 2001.

(51) Int. Cl.
G06F 9/45 (2006.01)

(52) U.S. Cl. .................... 703/22; 703/26; 717/100; 717/108; 717/134; 717/135

(58) Field of Classification Search .......... 703/22; 717/108, 100, 134, 135; 345/700
See application file for complete search history.

(56) References Cited

U.S. PATENT DOCUMENTS

| 5,187,788 A | 2/1993 | Marmelstein |
| 5,485,615 A | 1/1996 | Wennmyr |

(Continued)

FOREIGN PATENT DOCUMENTS

EP 1001338 A2 5/2000

(Continued)

OTHER PUBLICATIONS

"Language Independent Generation of graphical Representations of Source Code", Hendrix et al, ACM 0-89791-737-5, ACM 1995.*

(Continued)

*Primary Examiner*—Fred Ferris
(74) *Attorney, Agent, or Firm*—Gary R. Jarosik

(57) ABSTRACT

A system and method for intelligently generating computer code. The system being comprised of a local computer, which is connected to a remote computer via a network system or the Internet and which is capable of exchanging files with the remote computer. The local computer is further comprised of a document manager for transferring files between the local computer and the remote computer and for providing enhanced file management functions. The document manager works in connection with the server module, the site manager and the connectivity layer to connect to remote computers, to transparently exchange files with the remote computer and to manage server profiles and connection information that is related to remote computers and transferred files. Once the file is transferred to the local computer, the editor can modify the code associated with the file; the editor is also capable of creating new files. The visualizer is capable of displaying a program flow diagram and a data flow diagram, which are comprised of program flow icons and data flow arrows to depict the code in terms of processing blocks and data blocks. To assist in developing new code or editing existing code, the template manager allows the user to browse through a directory of existing code sections or templates and to copy templates into the selected code for editing. For allowing the editor to process code that is written in different Data Management System programming languages and for creating the program flow icons, the parser layer detects the file type of a selected file and activates the rules and logic that apply to the corresponding Data Management System.

16 Claims, 42 Drawing Sheets

U.S. PATENT DOCUMENTS

| | | | |
|---|---|---|---|
| 5,652,899 | A | 7/1997 | Mays et al. |
| 5,937,190 | A * | 8/1999 | Gregory et al. ............. 717/131 |
| 6,243,703 | B1 * | 6/2001 | Couch et al. ................. 707/10 |
| 6,311,323 | B1 | 10/2001 | Shulman et al. |
| 6,356,285 | B1 * | 3/2002 | Burkwald et al. .......... 715/853 |
| 6,604,110 | B1 | 8/2003 | Savage et al. |
| 6,851,107 | B1 * | 2/2005 | Coad et al. ................. 717/108 |
| 2001/0049682 | A1 * | 12/2001 | Vincent et al. ............. 707/100 |
| 2002/0059003 | A1 * | 5/2002 | Ruth et al. .................... 700/19 |
| 2002/0097253 | A1 * | 7/2002 | Charisius et al. ........... 345/700 |
| 2002/0112225 | A1 * | 8/2002 | Charisius et al. ........... 717/125 |
| 2002/0116702 | A1 * | 8/2002 | Aptus et al. ................ 717/170 |
| 2003/0041314 | A1 * | 2/2003 | Heeren et al. ............. 717/109 |
| 2003/0056192 | A1 * | 3/2003 | Burgess ...................... 717/100 |
| 2003/0061600 | A1 * | 3/2003 | Bates et al. ................. 717/133 |

FOREIGN PATENT DOCUMENTS

| | | |
|---|---|---|
| WO | WO 97/40443 A1 | 10/1997 |
| WO | WO 01/08007 A1 | 2/2001 |

OTHER PUBLICATIONS

"GENOA-A Customizable, Frount-End-Retargetable Source Code Analysis Framework", Devanbu, ACM Transactions on Software Engineering, vol. 8, No. 2, Apr. 1999.*

"Visualizing th Performance of Higher-Order Programs", Waddell et al., ACM 1-58133-055-04/98/0006, 1996 ACM.*

"Using a Fine-Grained Comparative Evaluation Technique to Understand and Design Software Visualization Tools", Mulholland, Seventh workshop on Empirical studies of programmers, ACM 1997.*

"An Analysis of Geometric Modeling in Database Systems", Kemper et al, ACM Computing Surveys, vol. 19, No. 1, Mar. 1987.*

Togethersoft Corporation, Together Documentation Set Version 4.2, Dec. 21, 2000, pp. 1-257.

Benedusi, P. et al., A Reverse Engineering Methodology to Reconstruct Hiearchical Data Flow Diagrams for Software Maintenance, Oct. 16-19, 1989, pp. 180-189.

SAS Institute, SAS Companion for the Microsoft Windows Environment, Using the Enhanced Editor, Sep. 1999.

SAS Institute, Bibliographic and copyright information, SAS onlinedoc, version 8, Sep. 1999, 1page.

Anonymous, Togethersoft Ships Together Control Center 4.2, Latest Business Process Automation Software Speeds Development Time for E-Business Apps, Dec. 21, 2000, 2 pages.

SAS e-intelligence, Know Your Customers, SAS Institute Inc., 2001.

* cited by examiner

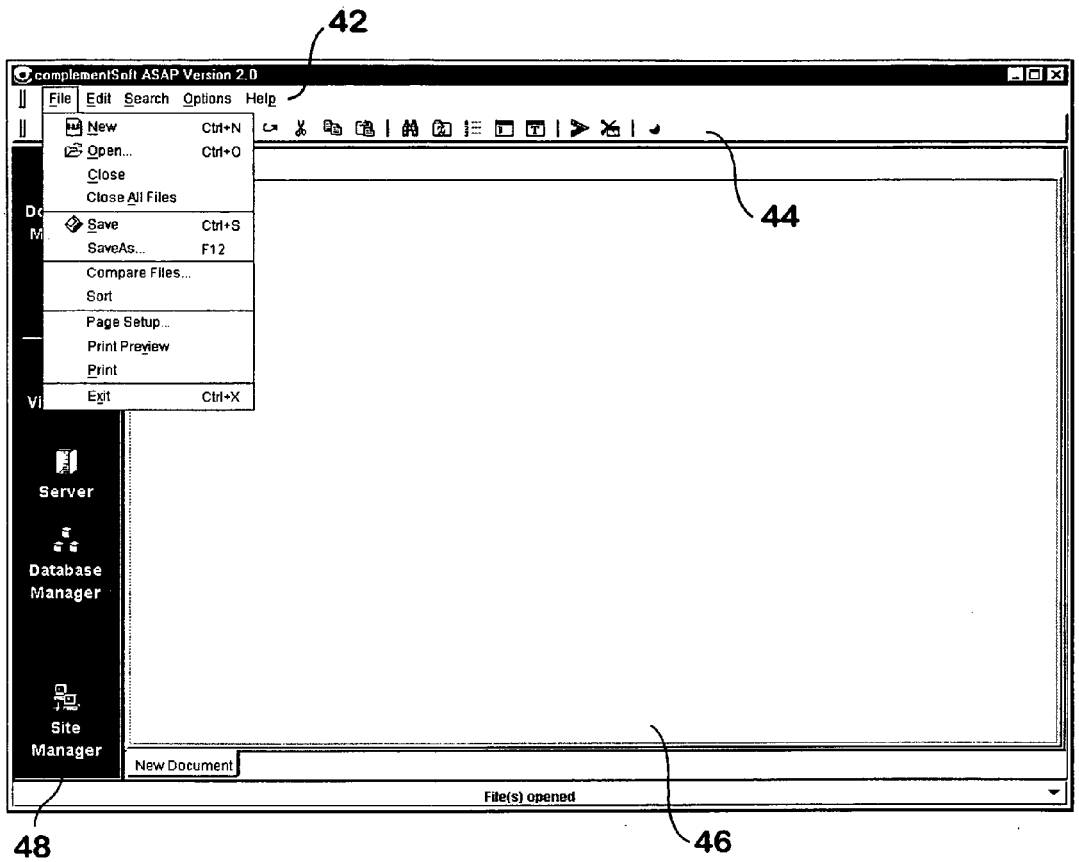

| Menu Item | Functionality |
|---|---|
| New | Create a new document ( a program ) |
| Open | Open an existing document |
| Close | Close the currently opened document |
| Save | Save the currently open document |
| Save As | Save the currently open document using a different name or in a different location |
| Print Preview | Print Preview of the currently open (active) document |
| Print | Print the currently open (active) document |
| Exit | Exit the application |

FIG. 4a

| Menu Item | Functionality |
|---|---|
| Find | |
| Replace | |
| Find Next | |
| Replace Next | |
| Goto Line | Go to the n line in the currently active document |

| Menu Item | Functionality |
|---|---|
| Document Manager Configuration | Activate the Document Manager Configurator |
| Editor Configuration | Activate the Editor Configurator |
| Visual Configuration | Activate the Visual Configurator |
| Connection Configuration | Activate the Connection Configurator |
| Network File Configuration | Activate the Network File Configurator |

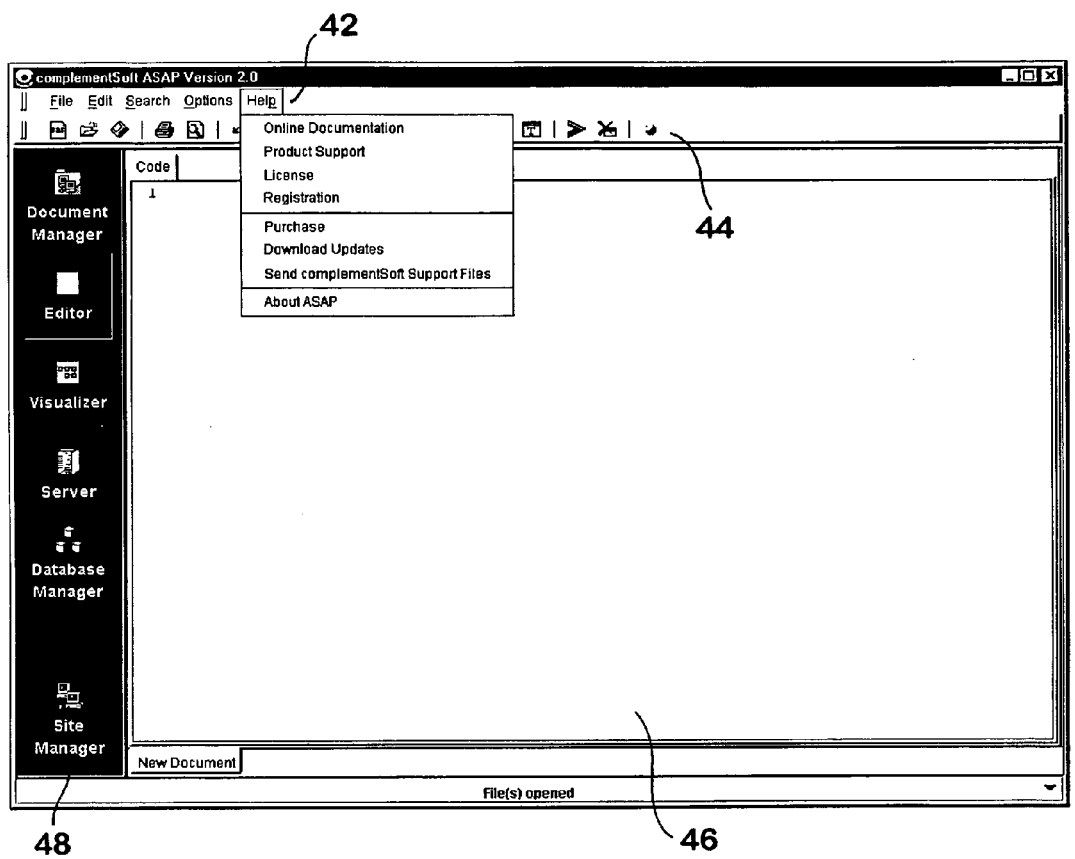

| Menu Item | Functionality |
| --- | --- |
| On-line Documentation | Show On-line Documentation |
| Product Support | Displays the Product Support Page with e-mail address, How to . . . and Frequently Asked Questions |
| License | Detailed license information with the ability to renew and/or upgrade the license |
| Registration | Perform on-line product registration |
| Purchase | Displays the complementSoft e-store |
| Download Updates | Retrieve Product Updates |
| Send complementsoft Support files | E-mail support files to complementSoft |
| About ASAP | Version and copyright information |

FIG. 4e

| Menu Item | Functionality |
|---|---|
| Undo | |
| Redo | |
| Cut | |
| Copy | |
| Paste | |
| Find | |
| Find Next | |
| Replace | |
| Replace Next | |
| Close | Close the currently active document |
| Line numbering | Turn line numbering on of off |
| Tree Split | Activate the Tree View split screen mode |
| Template Manager | Activate the Template Manager |
| Edit Properties | Edit the properties (timestamp, originating location, etc.) of the document |
| Execute Program | Execute the currently active program (i.e., the one that the user is currently editing)<br><br>The user can further specify the execution mode (i.e., how to execute, with which option turn on/off, etc) and execution location (i.e., where to execute, which server, which execution engine, which location)<br><br>If the user has previously activated Break-Point execution (see below), then the execution will be carried out based out the break-points, i.e., start at where the user indicate that it should start, end at where the user indicate that it should end and skipping statements as indicated by the user. |
| Toggle Break Points | Activate / deactivate Break-Point execution.<br>Setup Break-Points if they have not been previously setup.<br>Reset/Remove Break-Points if they have been previously setup |
| Message Manager | Activate the Message Manager to add, remove, or update the messages in the message repository |

FIG. 4f (continued)

| Menu Item | Functionality |
|---|---|
| New | |
| Open | |
| Save | |
| Print | |
| Print Preview | |
| Undo | |
| Redo | |
| Cut | |
| Copy | |
| Paste | |
| Find | Find a word |
| Refresh | Refresh the Editor display |
| Toggle Line Numbers | Show or hide line numbers |
| Toggle Tree View | Enable or disable Tree View |
| Template Manager | Activate the Template manager |
| Execute Program | Execute the currently active program |
| Close | Close the currently active program |
| Toggle Break Point Execution | Enable of disable Break Point Execution |

FIG. 5

```
Code & Log
39  PROC PRINT DATA=JOURNAL1x;
40      TITLE 'MASTER AFTER FIRST TRANSACTIONS ADDED';
41
42  DATA TODAY2;
43      INPUT ID AMOUNT TYPE;
44      DATE='01DEC87'd;
45      FORMAT DATE DATE7.;
46      CARDS;
47  0024 270.48 1
48  0024 578.31 1
```

```
38          PROC APPEND BASE=JOURNAL;

NOTE: Appending WORK.TODAY to WORK.JOURNAL.
NOTE: BASE data set does not exist. DATA file is being copied to BASE file.
02                                      The SAS System                08:22 Friday, NOTE: There were 5 observations read from the dataset WORK.TODAY.
NOTE: The data set WORK.JOURNAL has 5 observations and 4 variables.
NOTE: PROCEDURE APPEND used:
      real time           2.14 seconds 39          PROC PRINT DATA=JOURNAL1x;
ERROR: File WORK.JOURNAL1X.DATA does not exist.
```

SYSTEM AND METHOD FOR GENERATING AND MAINTAINING SOFTWARE CODE

RELATED APPLICATION

This subject application claims the benefit of U.S. Provisional Application Ser. Nos. 60/270,950, entitled "GUI SAS CODE Development and Maintenance Environment Software," filed on Feb. 23, 2001 and 60/293,854, entitled "Integrated Development Environment and GUI for Data Management Systems," filed on May 25, 2001.

BACKGROUND OF THE INVENTION

This invention relates generally to software maintenance and development tools and, more particularly, to an extensible, language independent software development tool having a graphical user interface, i.e., a GUI Integrated Development Environment.

The evolution of data manipulation and data management systems, such as SAS®, SPSS® and SQL®, and relational database management systems, such as IBM® DB2 UDB® and the Oracle® RDBMS, has resulted in several high-level software languages that are inconsistent and, in some cases, unstructured. Based on these inconsistencies and the unstructured nature of some of these languages, database management languages may be difficult to use, edit and debug. Moreover, because of the lack of a standardized syntax among these programming languages, it has been difficult for users of these languages to share code. This is particularly the case with SAS®.

Since the advent of personal computers and the GUI Interfaces such as Windows® Interfaces, it has become increasingly necessary for businesses to develop or purchase customized software in order to support specific business strategies or processes. This, in turn, has led to the implementation of a variety of software development tools and Integrated Development Environments ("IDEs"). Generally, these software development tools assist users and programmers in editing, debugging and developing software for specific programming languages. Software providers of data manipulation languages or systems have, however, failed to provide a single comprehensive software development tool capable of assisting users in the editing, visualizing, debugging and development of software. Furthermore, the creation of graphical development tools for particular programming languages, such as, SAS®, has been inhibited by the intricacies of the programming language itself.

Over the years, point solutions have been introduced to address specific issues. For example, there are a few GUI based ftp software packages to make the job of transferring and managing code easier. There are also a few GUI based editor software packages to make editing code easier. Still further, there are software packages that one can use to manually diagram program flow and data flow. What is lacking, however, is a software package that integrates these best of breed point solutions and integrates them in such a way that they work seamlessly with each other, e.g., to have an editor that is integrated with a ftp package so that the editor can edit files that are located in a remote server or to have the editor integrated with the diagramming package so the user does not have to manually generate and update program flow or data flow diagrams.

Thus, a need exists for an Integrated Development Environment for generating and maintaining software code, in particular, for data manipulation centric languages. More specifically, a need exists for a system and method for exchanging, editing, debugging, visualizing and developing SAS®, SPSS®, SQL®, DB2 UDB®, Oracle® RDBMS and other relational database management system software.

SUMMARY OF THE INVENTION

In accordance with these needs, the present invention is embodied in an Integrated Development Environment for generating and maintaining source code (software programmed in a software language), in particular, programmed in data manipulation languages. Generally, the system in which the Integrated Development Environment resides includes a local computer capable of exchanging files with a remote computer via a network system, i.e., a Local Area Network, a Wide Area Network, or the Internet. The local computer preferably hosts the Integrated Developers Environment which is further comprised of a document manager for transferring files and otherwise providing enhanced file management functions, such as, version synchronization across multiple platforms. The document manager works in connection with a server module, a site manager and a connectivity layer which is part of the Integrated Development Environment to connect to remote computers, to transparently exchange files with the remote computer and to manage server profiles and connection information that is related to remote computers and transferred files.

Once a file is transferred to the local computer, an editor, which is included as part of and integrated with the Integrated Development Environment, can modify the code associated with the file. In addition, the editor is also capable of creating new files and provides many advanced editing features such as visual execution break points, standardized formatting of files, and line numbering to name a few. A visualizer, i.e., a software tools that reads the code and generates diagrams and graphical representation of the program flow, data flow or the logic of the code, is also integrated and included as part of the Integrated Development Environment. Program flow diagrams are comprised of program block icons and arrows to depict the code's program flow. Data flow diagrams are comprised of icons depicting data processing steps and arrows to depict the flow of the data through the program. Preferably, the visualizer and editor are integrated so that changes made to the code in the editor are immediately reflected in the visualizer and vice-versa. The visualizer can also read information from execution logs and execution outputs to display the execution path for selected code and automatically display insightful debugging and optimization information for the selected code to the user.

To assist in developing new code or editing existing code, the Integrated Development Environment further includes a template manager that allows the user to browse through a repository of existing code or templates and to copy templates into the selected code for editing.

For allowing the editor to process code that is written in different Data Manipulation System programming languages and for creating the program flow icons, the Integrated Development Environment additionally includes a parser layer. The parser layer detects the type of code in the selected file and activates the rules and logic that apply to the corresponding Data Manipulation System programming language.

As will become apparent from the detailed description that follows, the subject Integrated Development Environment provides, among others, the following unique functions: seamlessly exchanging with and executing files on local and remote computers, where the site manager is capable of compiling connection information for remote computers necessary to achieve the seamless transfer and execution of files; automatically generating program flow and data flow diagrams, where the program flow and data flow diagrams can be viewed at various levels of abstraction and where the user is capable of utilizing a step-wise function to collapse or expand the levels of abstraction to view; and automatically parsing the execution log to automatically match errors and warnings in the log file to the appropriate corresponding lines of code in the program file in order to ease the ability to correct the error, to visually highlight problematic areas, and to generate user customizable error messages and debugging advice for such problematic areas.

A better understanding of these and other objects, advantages, features, properties and relationships of the invention will be obtained from the following detailed description and accompanying drawings which set forth an illustrative embodiment and which are indicative of the various ways in which the principles of the invention may be employed.

BRIEF DESCRIPTION OF DRAWINGS

For a better understanding of the invention, reference may be had to a preferred embodiment shown in the following drawings in which:

FIG. 4a–f are exemplary screen shots and corresponding tables depicting icons that are representative of menu items included on the Menu bar, along with the name of each menu item and a functional description of pertinent menu items;

FIG. 5 is a diagram illustrating the tool bar and a corresponding table describing the pertinent functions associated with the buttons included on the Tool bar;

FIG. 20a is an exemplary screen shot depicting the visualizer with a problematic code section and a corresponding error log for that code section;

FIG. 23 depicts an exemplary file with break points added.

DETAILED DESCRIPTION

Figure 1:
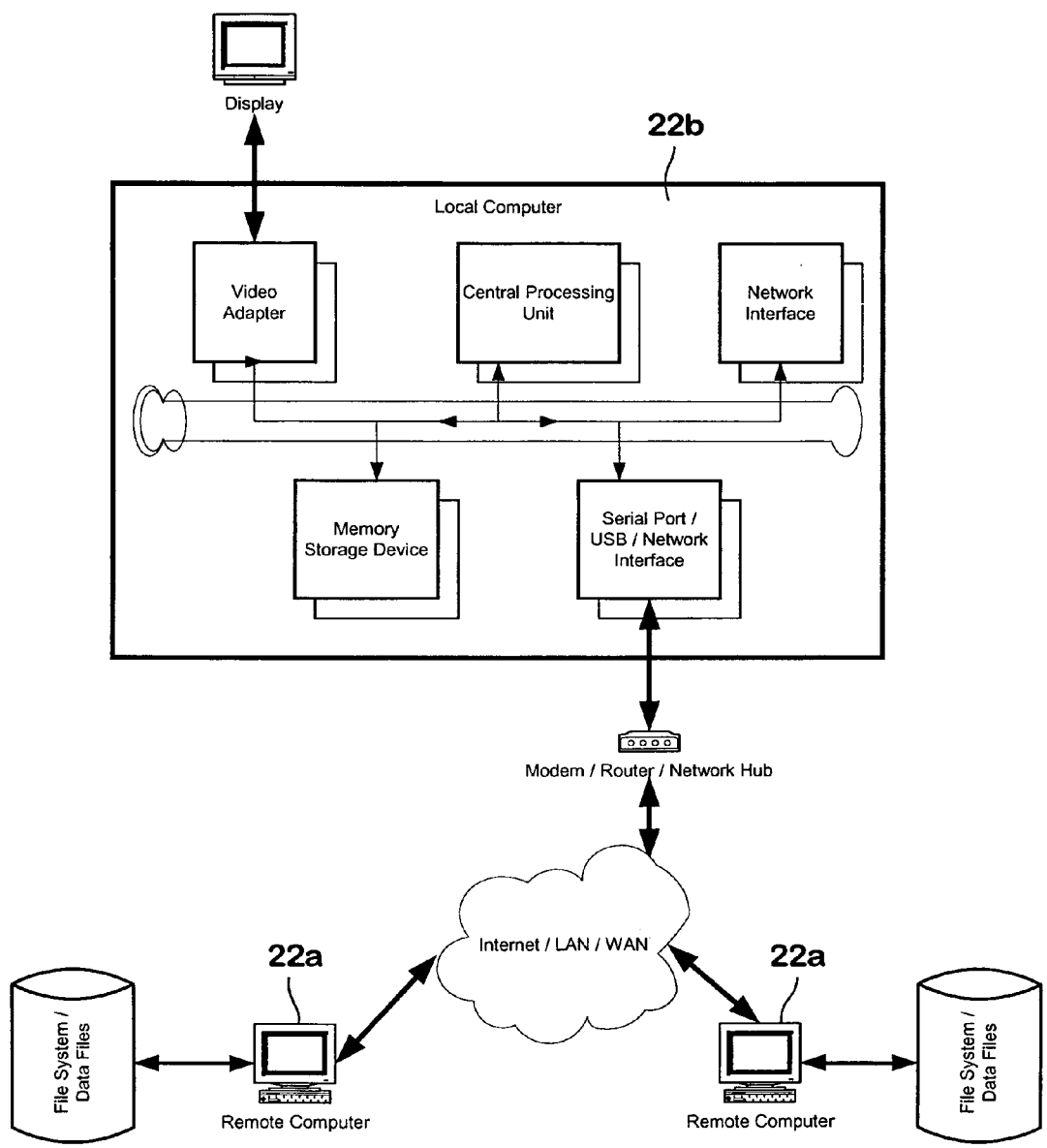
FIG. 1 is a diagram illustrating an exemplary computer network for generating, maintaining and executing computer code.

Turning now to the Figures, wherein like reference numerals refer to like elements, there is illustrated an Integrated Development Environment having numerous cooperating modules which together provide a system and method for generating and maintaining software, in particular, the software for data development and data manipulation languages. Although not required, the system and method will be described in the general context of a computer network 20, illustrated in FIG. 1, and computer executable instructions being executed by general purpose computing devices within the computer network 20. In this regard, the general purpose computing devices may comprise one or more remote computers 22a, and one or more local computers 22b, hosting an integrated software application 30. The computer network 20 can also include one or more databases 24. It should be appreciated that the network components could be described as having client and server relationships, as generally known in the art.

Figure 2:
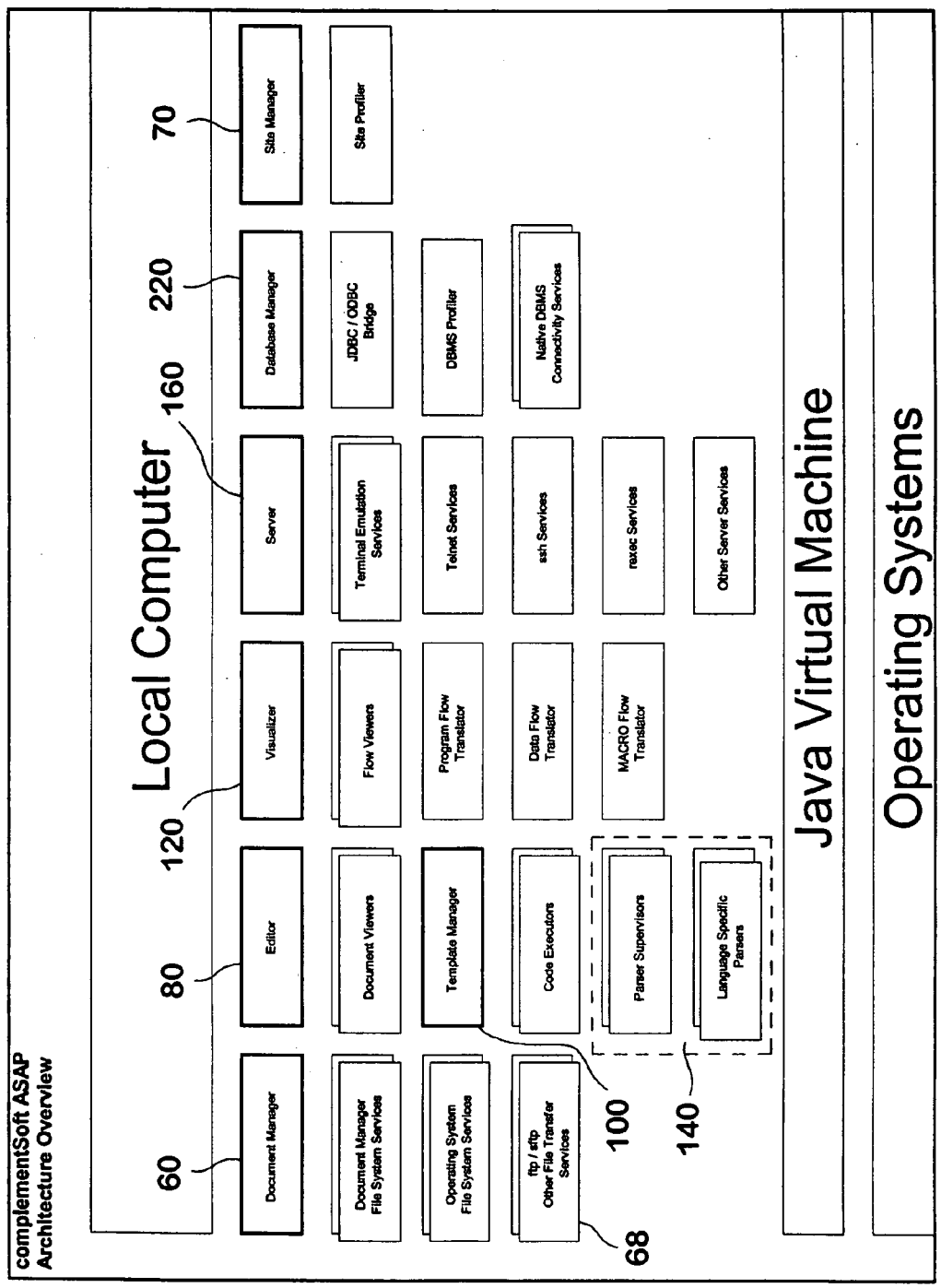
FIG. 2 is a diagram illustrating exemplary components of the local computer.

To allow the local computers 22b to generate and maintain code written in various programming languages, the integrated software application 30 will reside on the local computer 22b. Further, as shown in FIG. 2, it is preferable that the integrated software application 30 execute on a Java Virtual Machine ("JVM") which acts as an interface between the integrated software application and the operating system for the local computer 22b. Although the operating system for the local computer 22b is preferably Windows® based, it should be understood that the local computer 22*b* could employ any one of the currently existing operating systems, such as LINUX®, UNIX®, MAC OS®, etc.

Figure 3:
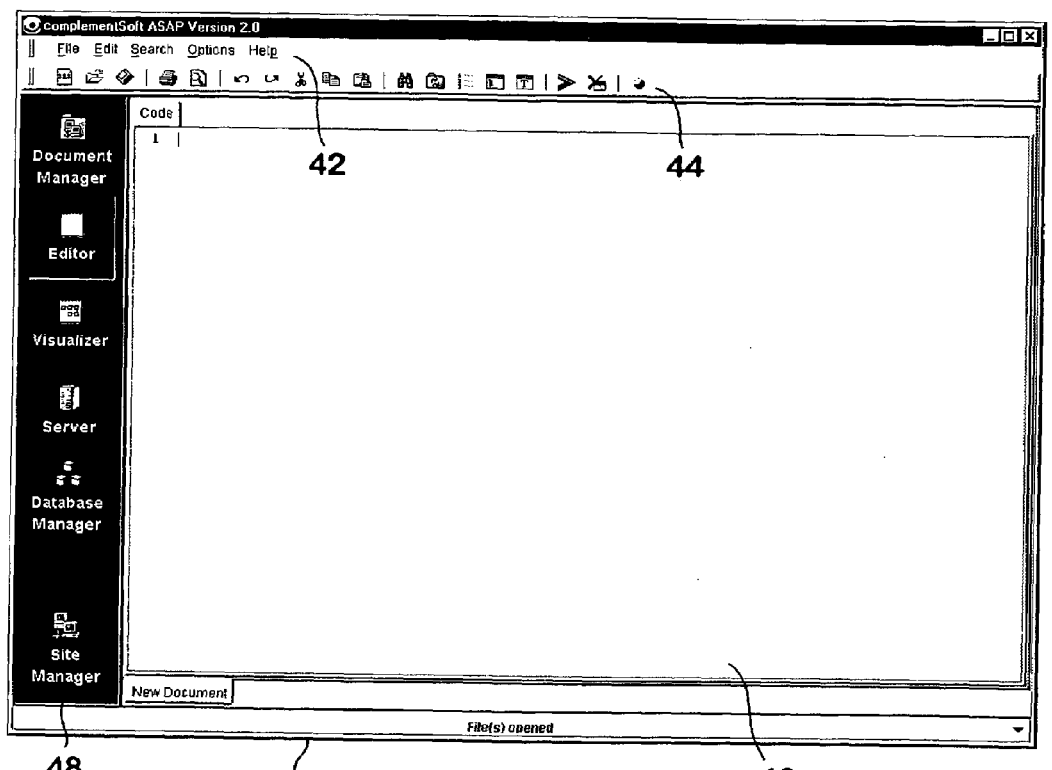
FIG. 3 is an exemplary screen shot depicting a graphical user interface displaying a Menu bar, a Tool bar, a Display area (in this case the Editor) and a Navigation bar.
Figure 4B:
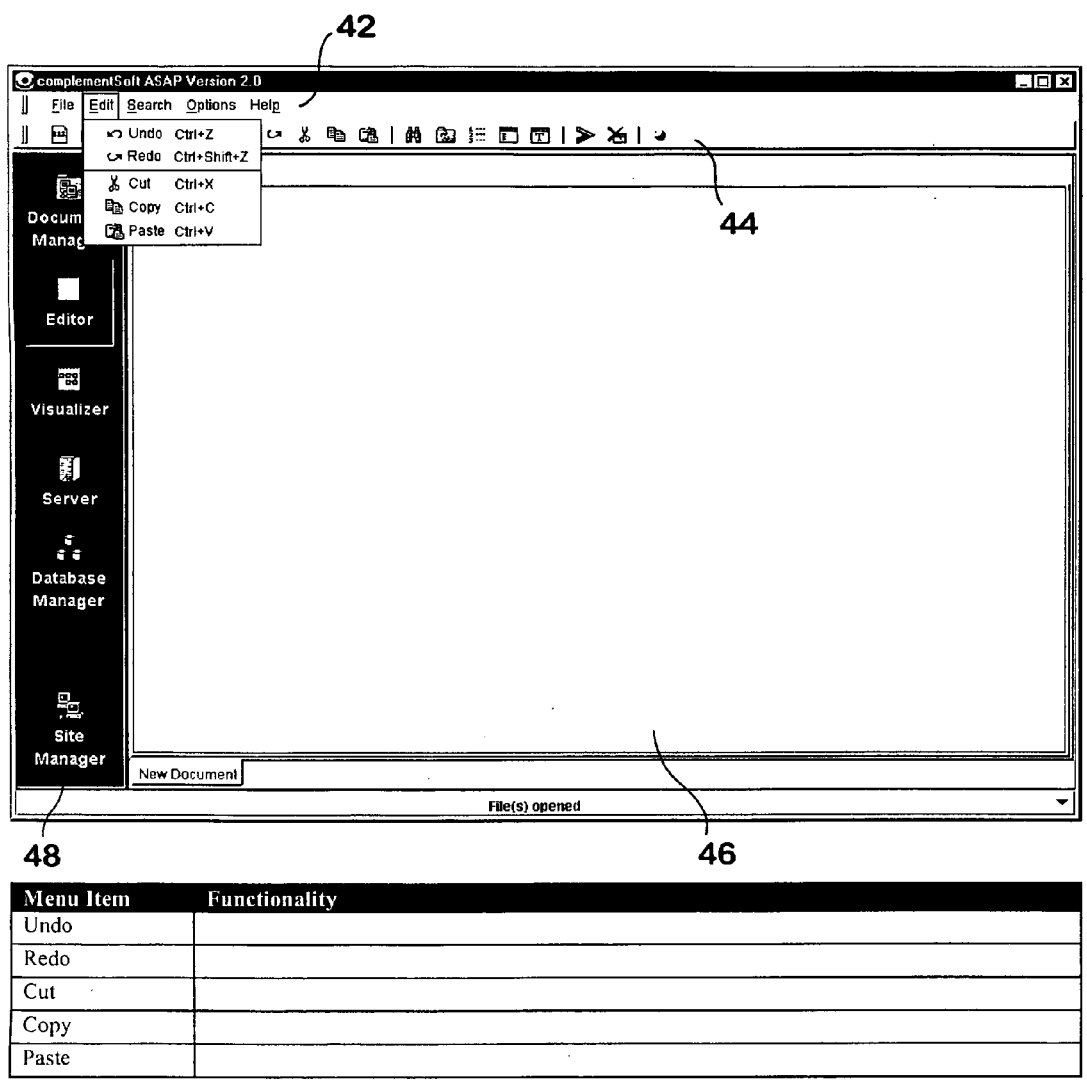
Figure 4C:
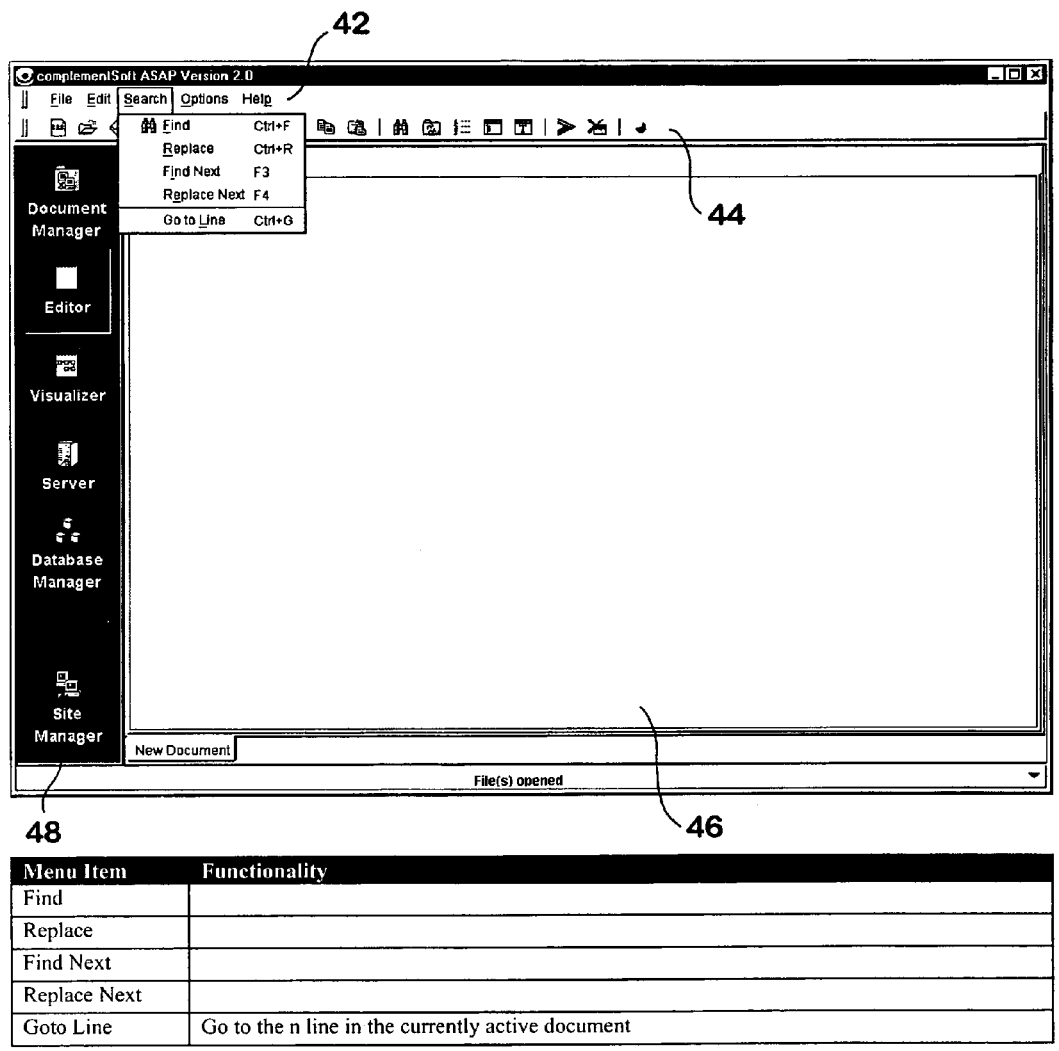
Figure 4D:
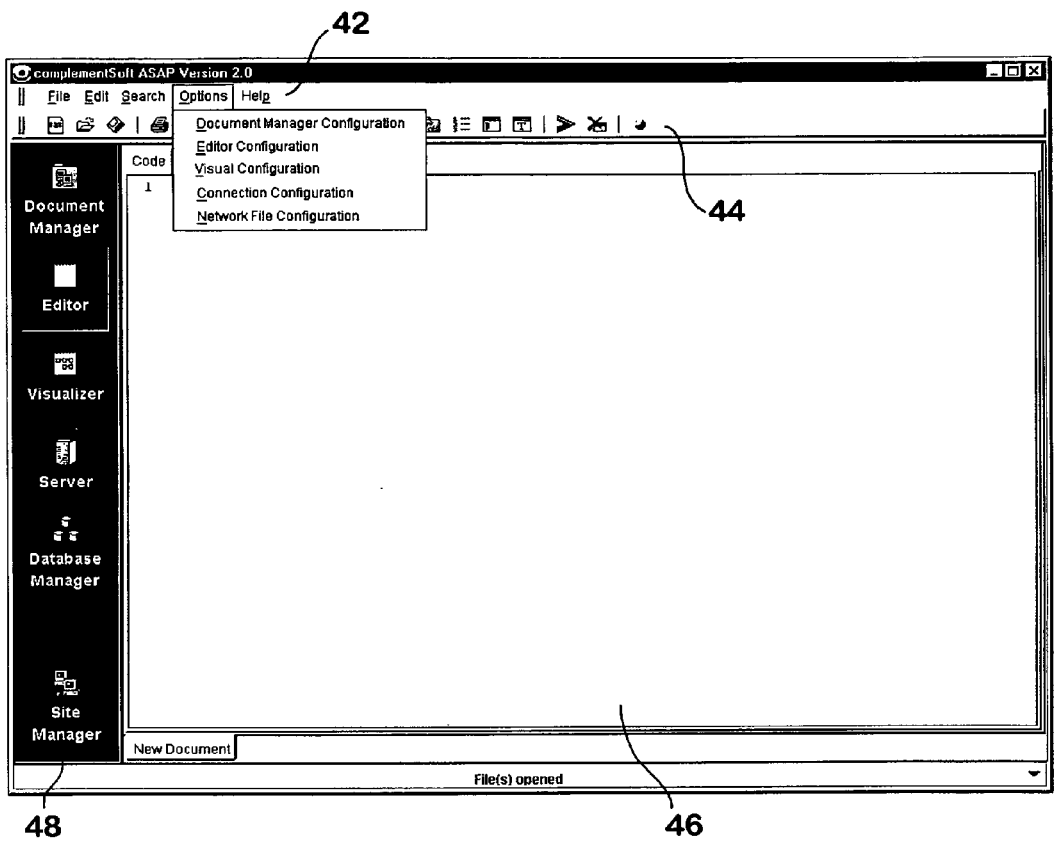
Figure 4D:
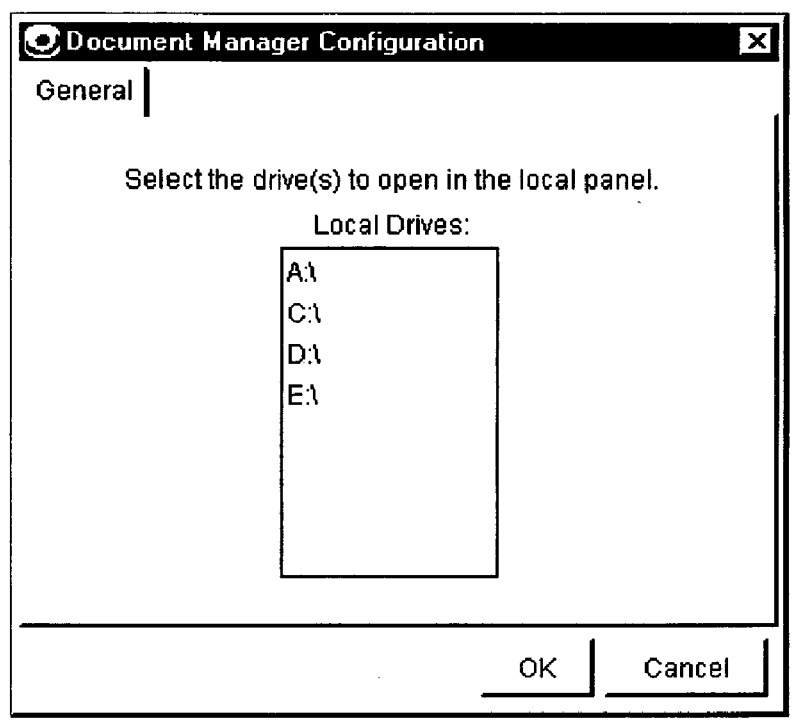
Figure 4D:
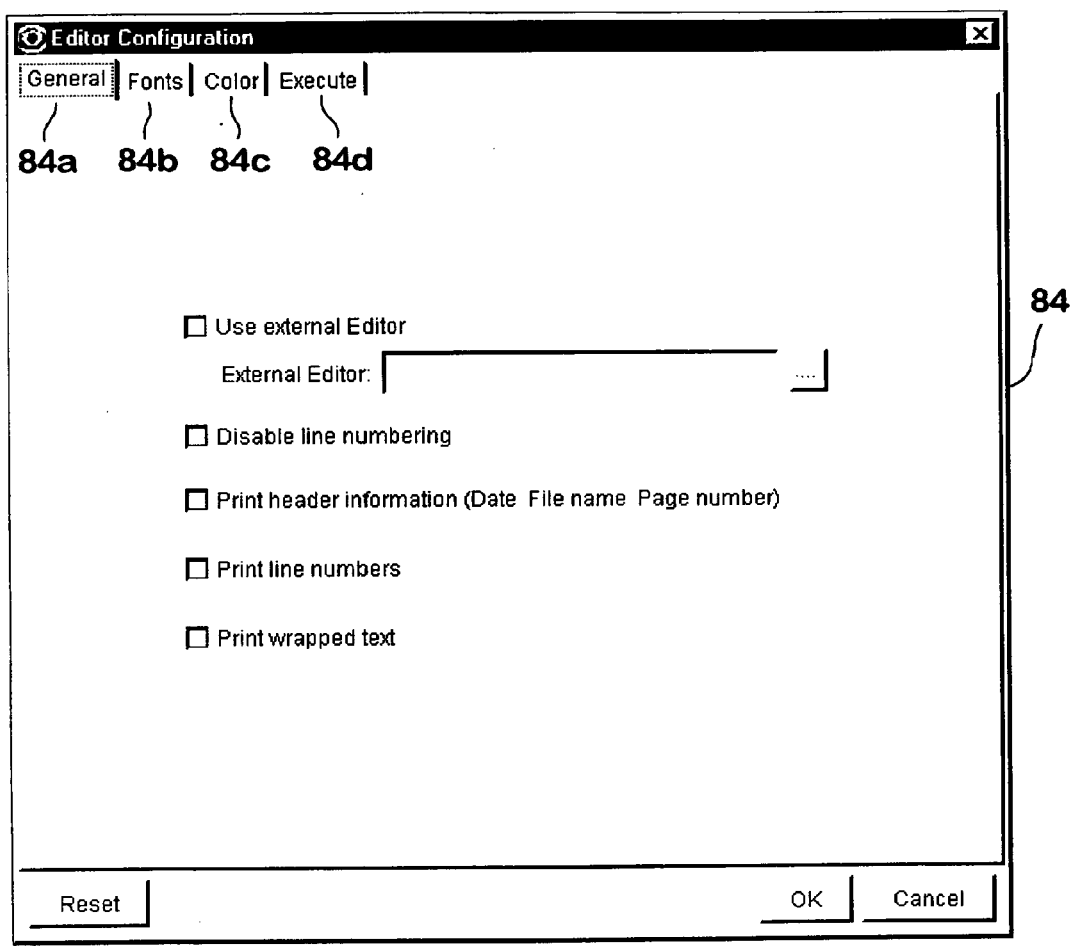
Figure 4D:
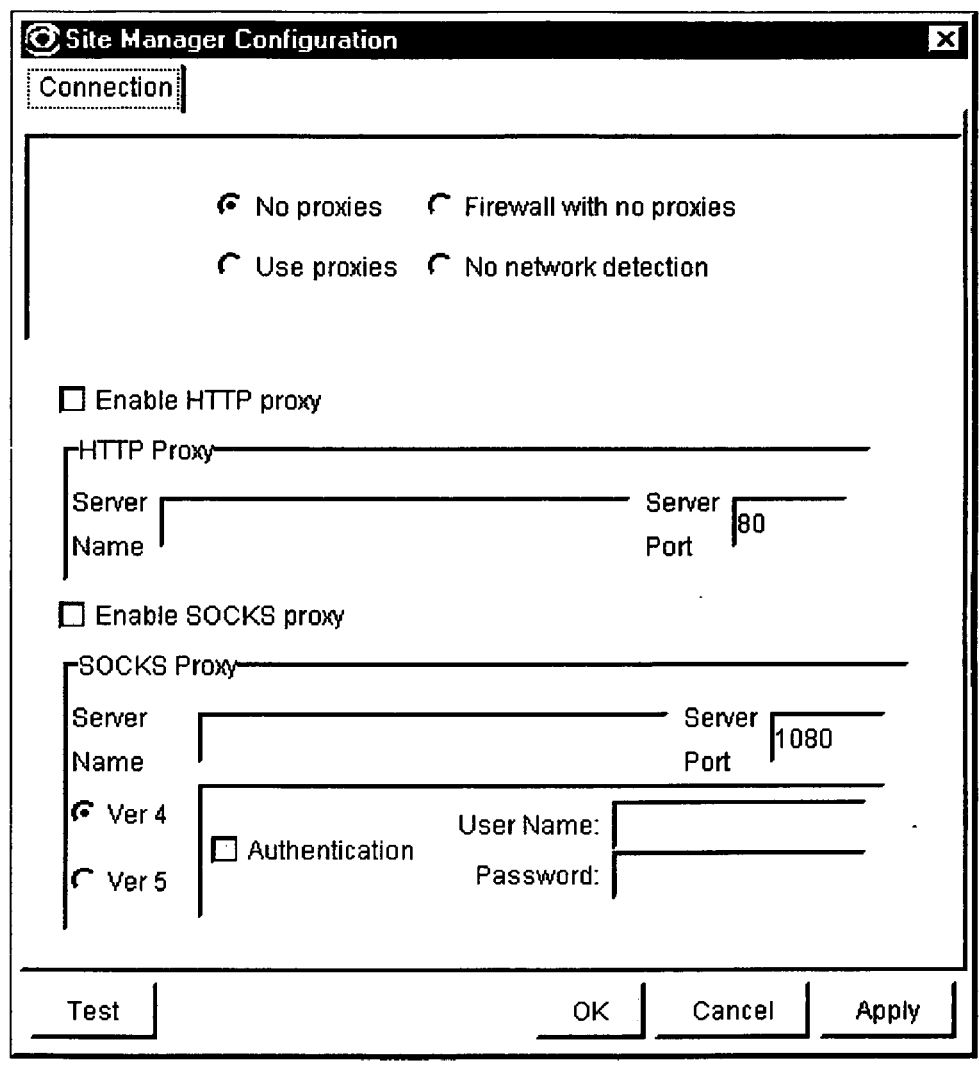
Figure 4D:
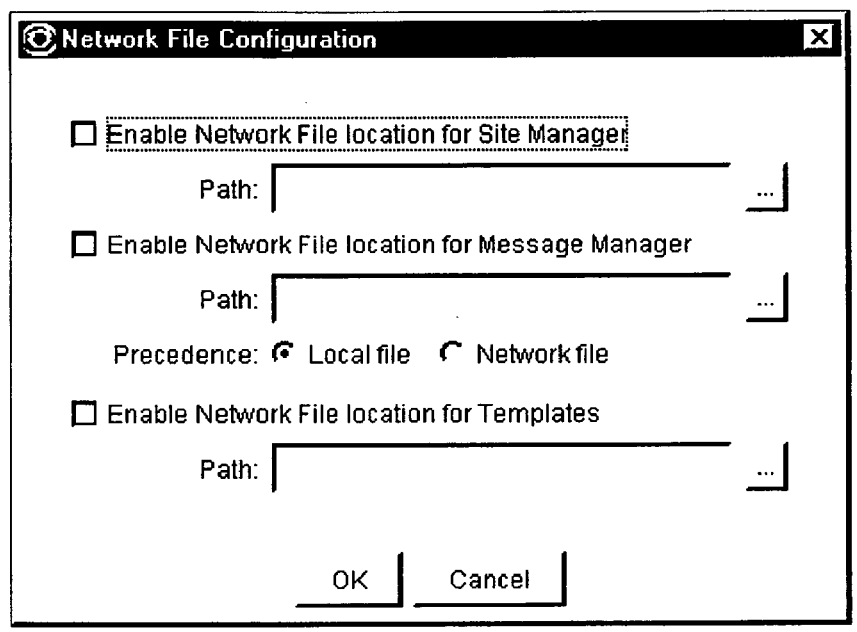
Figure 4F:
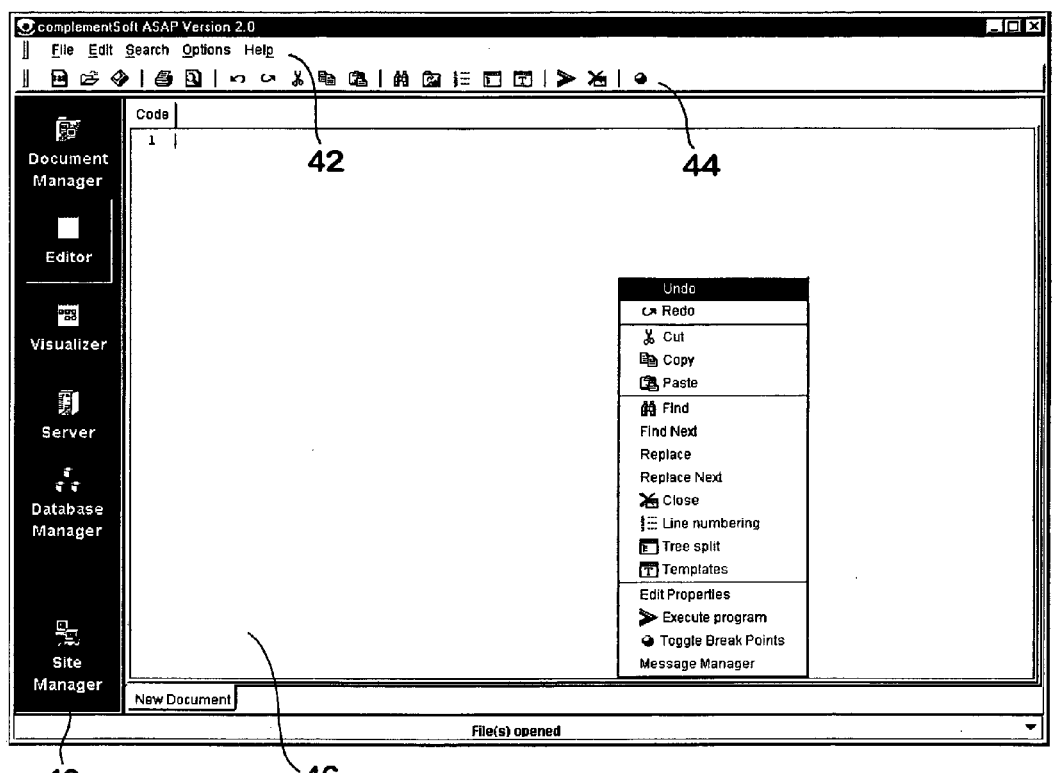

For editing, generating and maintaining software (i.e., program code), the local computers 22*b* include a graphical user interface 40. As shown in FIG. 3, the graphical user interface 40 is further comprised of a menu bar 42, a tool bar 44, a display area 46 and a navigation bar 48. FIGS. 4*a*–4*e* shows exemplary drop-down menu items included on the menu bar, along with a brief description of the functionality associated with those options. FIG. 4*f* shows the "Right-Click" menu. The tool bar 44 is further comprised of and displays several buttons, including a template manager button 44*a*, which serves as a link to a template manager 100. In addition, FIG. 5 shows exemplary buttons included on the tool bar 44, along with a brief description of the functionality associated with those buttons. The navigation bar 48 is further comprised of and displays a document manager button 48*a*, a site manager button 48*b*, an editor button 48*c*, a visualizer button 48*d*, a database manager button 48*f*, and a server button 48*e*, which serve as links to modules corresponding with these respective buttons, i.e., a document manager 60, a site manager 70, an editor 80, a visualizer 120, a database manager 121, and a server module 160, each of which will be described in greater detail below.

As will be appreciated by those of skill in the art, the computers 22*a*, 22*b* need not be limited to personal computers, but may include hand-held devices, multiprocessor systems, microprocessor-based or programmable consumer electronics, minicomputers, mainframe computers, personal digital assistants, cellular telephones or the like depending upon their intended end use within the system. For performing the procedures described hereinafter, the computer executable instructions may be written as routines, programs, objects, components, and/or data structures that perform particular tasks. Within the computer network 20, the computer executable instructions may reside on a single computer 22*a*, 22*b* or the tasks performed by the computer executable instructions may be distributed among a plurality of the computers 22*a*, 22*b*. Therefore, while described in the context of a computer network, it should also be understood that the present invention may be embodied in a stand-alone, general purpose computing device that need not be connected to a network.

To perform the particular tasks in accordance with the computer executable instructions, the computers 22*a*, 22*b* may include, as needed, a video adapter, a processing unit, a system memory, and a system bus that couples the system memory to the processing unit. The video adapter allows the computers 22*a*, 22*b* to support a display, such as a cathode ray tube ("CRT"), a liquid crystal display ("LCD"), a flat screen monitor, a touch screen monitor or similar means for displaying textual and graphical data to a user. The display allows a user to view information, such as, code, file directories, error logs, execution logs and graphical user interface tools.

The computers 22*a*, 22*b* may further include read only memory (ROM), a hard disk drive for reading from and writing to a hard disk, a magnetic disk drive for reading from and writing to a magnetic disk, and/or an optical disk drive for reading from and writing to a removable optical disk. The hard disk drive, magnetic disk drive, and optical disk drive may be connected to the system bus by a hard disk drive interface, a magnetic disk drive interface, and an optical disk drive interface, respectively. The drives and their associated computer-readable media provide a means of non-volatile storage for the computer executable instructions and any other data structures, program modules, databases, etc. utilized during the operation of the computers 22*a*, 22*b*.

To connect the computers 22*a*, 22*b* within the computer network 20, the computers 22*a*, 22*b* may include a network interface or adapter. When used in a wide area network, such as the Internet, the computers 22*a*, 22*b* typically include a modem or similar device. The modem, which may be internal or external, is connected to the system bus via a serial port interface. It will be appreciated that the described network connections are exemplary and that other means of establishing a communications link between the computers 22*a*, 22*b* may be used. For example, the system may also include a wireless access interface that receives and transmits information via a wireless communications medium, such as a cellular communications network, a satellite communications network, or another similar type of wireless network. It should also be appreciated that the network interface will be capable of employing TCP/IP, FTP, SFTP, Telnet SSH, HTTP, SHTTP, RSH, REXEC, etc. and other network connectivity protocols.

For seamlessly transferring files, the document manager 60 is utilized. The document manager 60 is a file management program that performs many enhanced file management functions, such as recognizing related files, (e.g., execution log files, output files, include files, etc.) and managing related files as a unit, regardless of the location of such files. For example, if the user causes the document manager 60 to transfer a file from the remote computer 22*a* to the local computer 22*b*, the document manager 60 may also determine whether any related files exist, i.e., files that are or will be used in conjunction with the file that the user is transferring, and transfer those files as well. As will be described in further detail below, these enhanced file management functions, including managing related files and storing information, such as origination and timestamp information about these files, allow the user to exchange files with and execute code on local computers 22*b* and/or remote computers 22*a*. To accomplish the enhanced file management functions, the document manager 60 may also include an intelligent module 62, a security layer 66 and a file transfer program 68.

The intelligent module 62 enables the document manager 60 to track pertinent file transfer information 64 that enable the performance of enhanced file management functions, including, uploading files from a source computer and returning/downloading an edited version of the same file to the same source computer for storage, execution, etc. To accomplish the functions of returning edited files to the source computer and executing edited files remotely, the file transfer information 64 may include a source computer identifier, a file directory identifier, a content identifier, a timestamp or other information capable of allowing the tracking of the type or path of files that are transferred between computers 22*a*, 22*b* or within a single computer 22*b*.

To ensure that the integrity and security of the network 20 is maintained, a security layer 66 is utilized. The security layer 66, which is part of the site manager 70, may save server login information supplied by the site manager 70 thereby allowing subsequent file exchanges to be handled transparently. The security layer 66 may also be capable of configuring the integrated software application 30 to work with firewalls. The site manager 70 gathers server login information and similar information for use by the document manager 60, the intelligent module 62 and the security layer 66, and interacts closely with each of these modules. Preferably, remote file access and file execution are handled centrally through the site manager 70.

Figure 6:
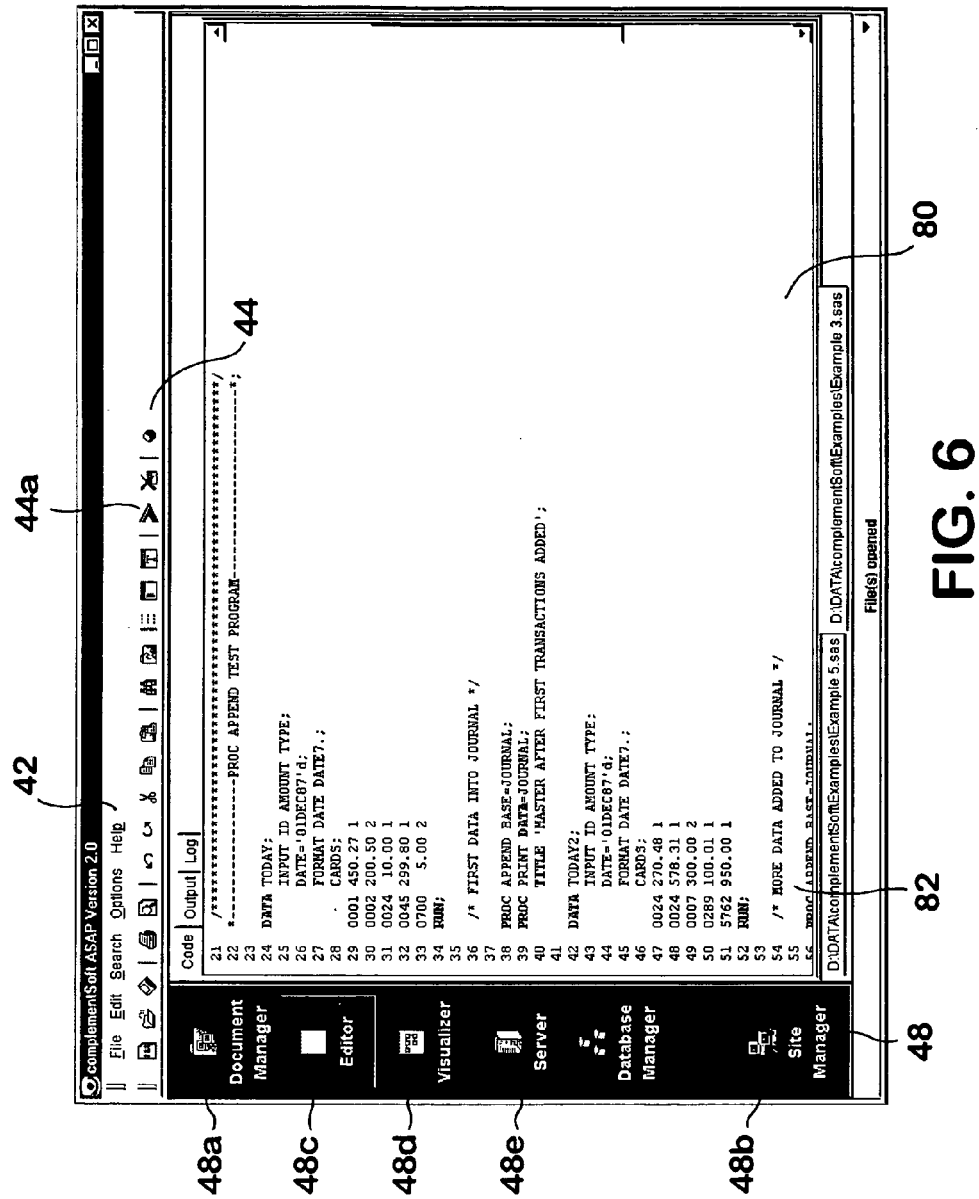
FIG. 6 is an exemplary screen shot depicting an Editor window in Full Screen mode, along with corresponding output and log file tabs.

To maintain existing software and develop new software, the editor 80 allows the user to perform standard text editing functions, including, mouse placement of the cursor, click-and-drag text selection and standard Windows® key combinations for cutting, copying and pasting data. While editing code that has been previously executed, the associated log files and output files that are stored in the same directory 104 as the code will automatically be opened and each of these files will include a corresponding tab 84a, 84b, as shown in FIG. 6. The user can access each of these files by clicking on the corresponding tab 84a or 84b and switch between several related files by clicking on different tabs. The editor 80, the document manager 60 and the site manager 70 cooperate to track the association between edited code, the log files and output files that are generated by the edited code, and the remote system on which edited code may be executed. The editor 80 may also employ language-specific syntax checking and auto-correct functions to enhance the software development capability of the integrated software application 30.

Figure 7:
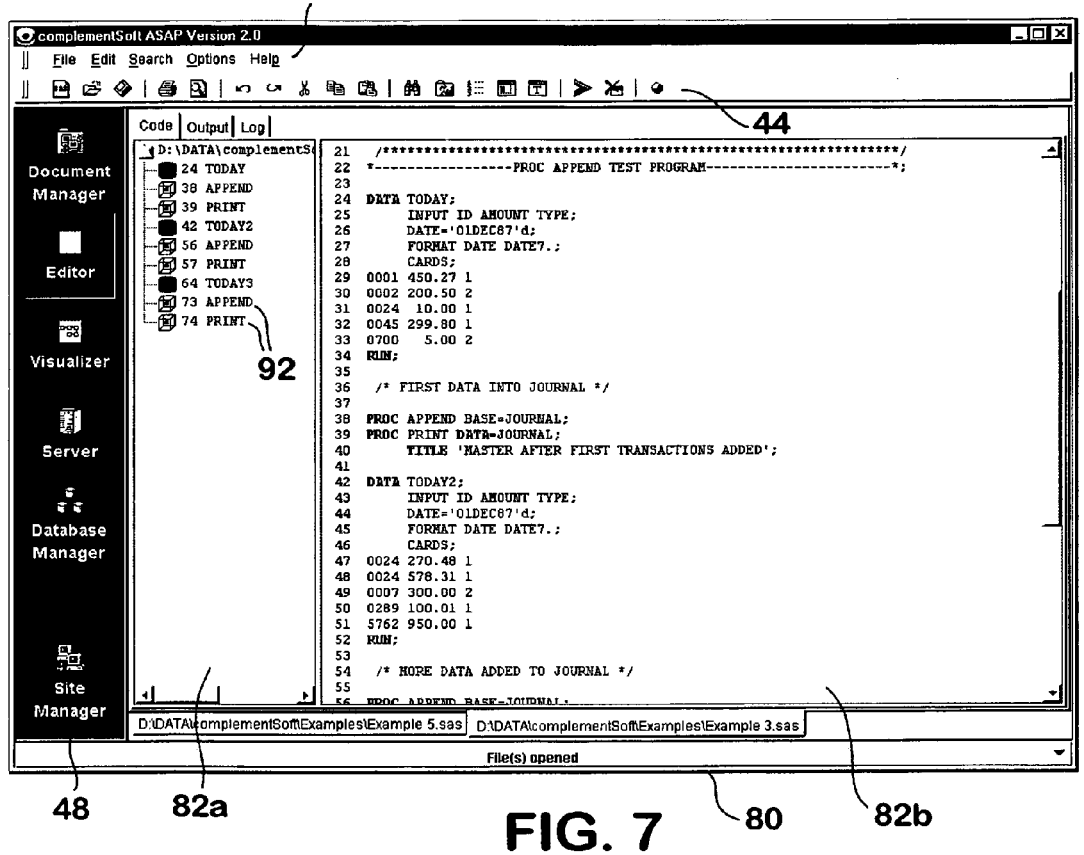
FIG. 7 is an exemplary screen shot depicting a tree view, along with the corresponding code segments.

To make the code more manageable and allow the user to see a more abstract version of the code, the editor 80 also provides a means to invoke a tree view 90, which may be displayed near the editor 80. The tree view 90 depicts individual procedures and data blocks as active elements 82 and shows the code at a high level. Since each active element 82 is representative of a larger code segment, as shown in FIG. 7, the user can navigate throughout the code by selecting active elements 82 and thereby displaying the larger code segment associated with the selected active element 82 (i.e., the editor will automatically scroll to the region where the code segment is visible). To make it easier to cut, copy or move code segment, the user can right-click on an active elements in the tree. This will cause the editor to automatically scroll to the region where the code segment is located and highlight the entire code segment. The user can then cut or copy the highlighted code segment to the clipboard.

Figure 8:
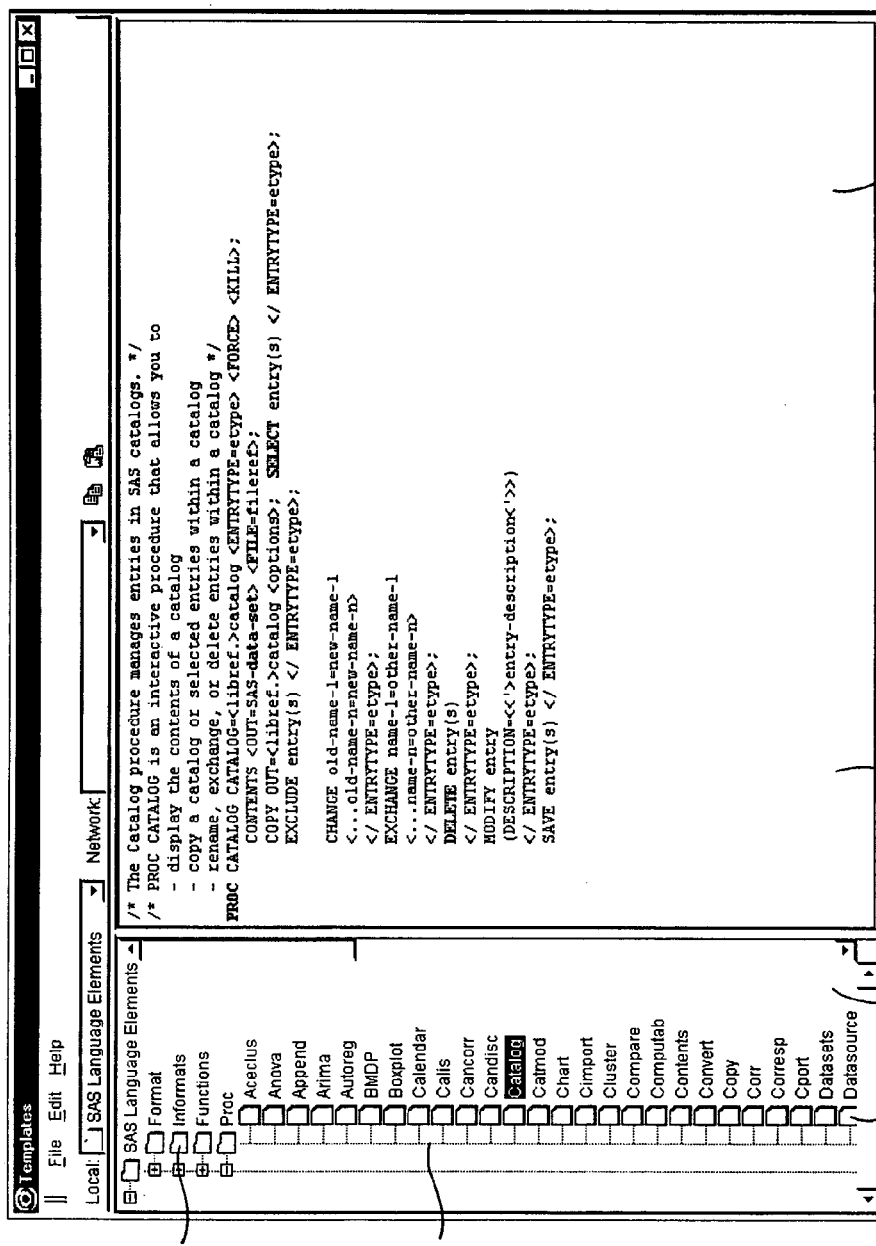
FIG. 8 is an exemplary screen shot depicting a template manager window with available templates.

For enabling users to add pre-existing lines of code or templates 106 to a program being edited or created, the editor 80 also includes the template manager 110, which may be accessible to the user by clicking on the Template button on the tool bar 44 menu. As shown in FIG. 8, the template manager window 102 includes a directory 104 of templates 106, which are both pre-built and written by the user and which may be examined by navigating the directory 104 in a manner that is well-known in the art. The template manager 110 allows the user to insert templates 106 directly into the code that is being created/edited. In addition, the template manager 110 also allows the user to create and organize their own templates 106. Still further, the template manager 110 could be used in connection with the Internet and a web browser to view and retrieve templates stored at remote locations, such as web sites, bulletin boards, etc. The Template Manager 100 can store the templates (both built-in and those developed by the user) locally and/or centrally on a remote server making it easy for the entire workgroup or enterprise to share these templates.

In addition, the editor 80 may also provide an auto-complete function capable of automatically generating code based on templates 106 managed by the template manager 100. For example, as soon as a user keys in a recognized key word, the editor 80 will automatically perform a look-up function for that keyword in the directory 104. If a template 106 includes a matching keyword, then the editor 80 may automatically paste the template into the display area. If more than one template 106 matches the keyword, then a pop-up window will be displayed presenting the user with the option of selecting one of the matching templates. It should also be appreciated that the user customize the integrated software application 30 by enabling or disabling the auto-complete feature.

Figure 9:
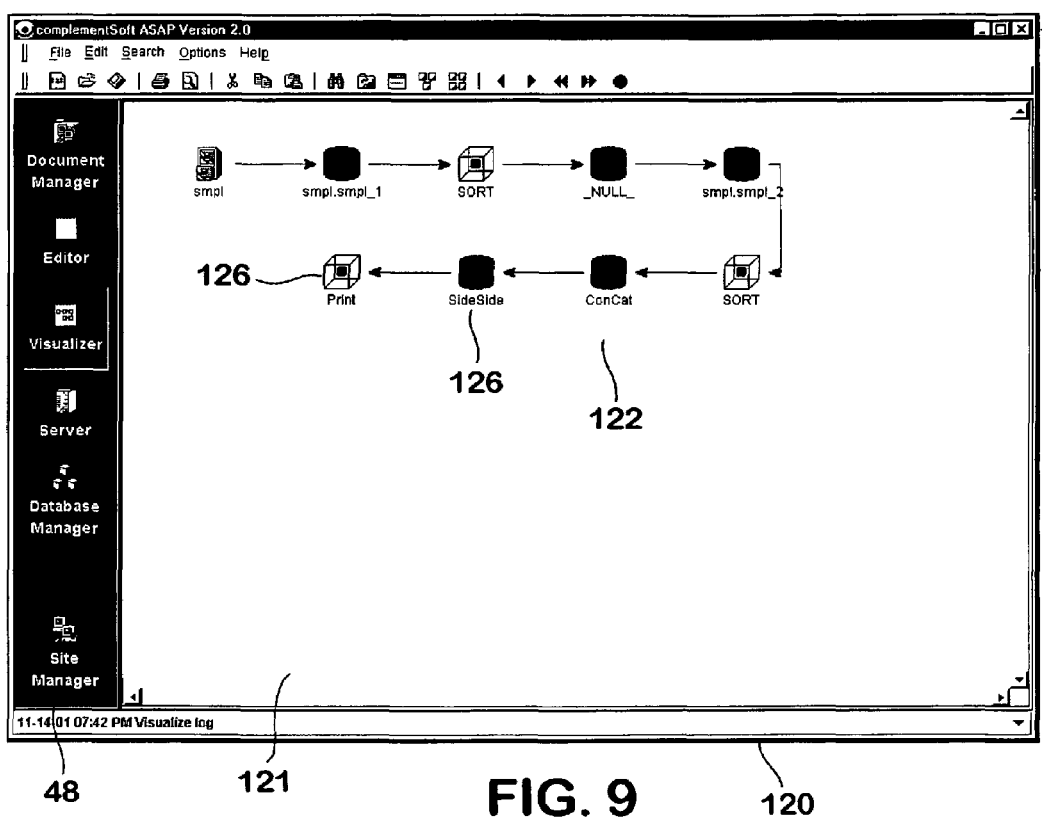
FIG. 9 is an exemplary screen shot depicting a program flow for a selected file, along with arrows that indicate the flow of data within the program flow.

For viewing the program flow and data flow of a selected program, as will be further described below, the visualizer 120, in connection with a parser layer 140, reads, parses and displays the code for the selected program, representing each program and data block with a program flow icon 126. As illustrated in FIG. 9, arrows connect these program flow icons 126 to generally illustrate the flow of data.

Assuming that the designated code segment has been executed previously and that the execution log is readily available, the user may also "mouse-over" the program flow icon to display the comments and execution statistics, i.e., CPU usage, number of row processed, etc., associated with the block. Right-clicking on the program flow icon will activate specific functions or options associated with the icon. For example, the dataset icon (i.e., an icon that represents a dataset or a table) will display a list of data inspection or data discovery functions, including ad hoc SQL® queries. Ad hoc SQL® queries that are selected may be executed by the respective engine. These engines (e.g., SAS, DB2 UDB, or other RDBMS servers) can resides locally on the user's workstation or remotely on the LAN/WAN and the results, once retrieved will be displayed in a pop-up output window.

Figure 10:
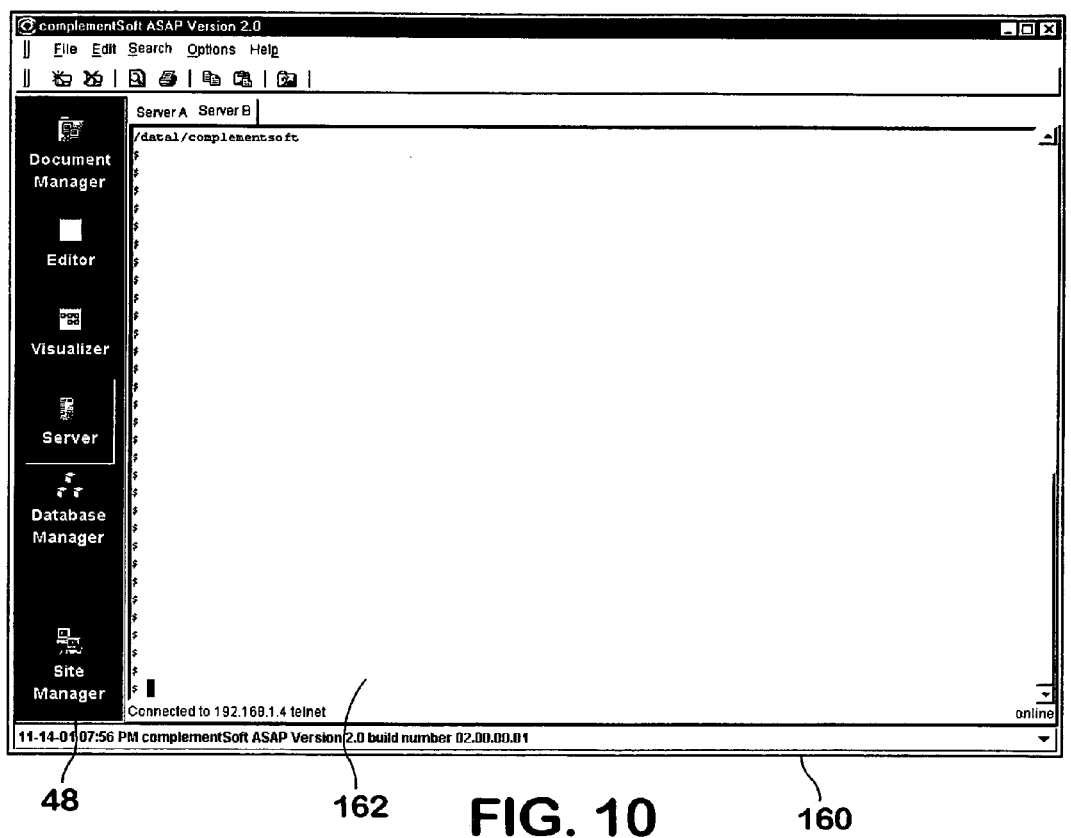
FIG. 10 is an exemplary screen shot depicting a server module window configured for automated login and including session tabs for Server A and Server B.

To access and interact with remote computers 22a via command lines, the server module 160 acts as a robust terminal emulator. The server module 160 allows users to open one or more sessions thereby simultaneously gaining access to one or more hosts/remote computers 22a. In addition, the user has the option of executing edited code on a remote computer 22a, by employing the server module 160, in connection with the site manager 70, to connect the local computer 22b to the remote computer 22a, as will be described in more detail below. Once a session is opened, a terminal tab for the respective session can be created and displayed to the user by the server module 160, as illustrated in FIG. 10. It should be understood by those with skill in the art that the server module 160, the site manager 70 and the document manager 60 all preferably interact with one another to effectuate the transfer of code between the remote server computers 22a and the local computer 22b. It should also be understood that each of these modules could be combined or further divided to form one single module or additional modules.

Figure 11:
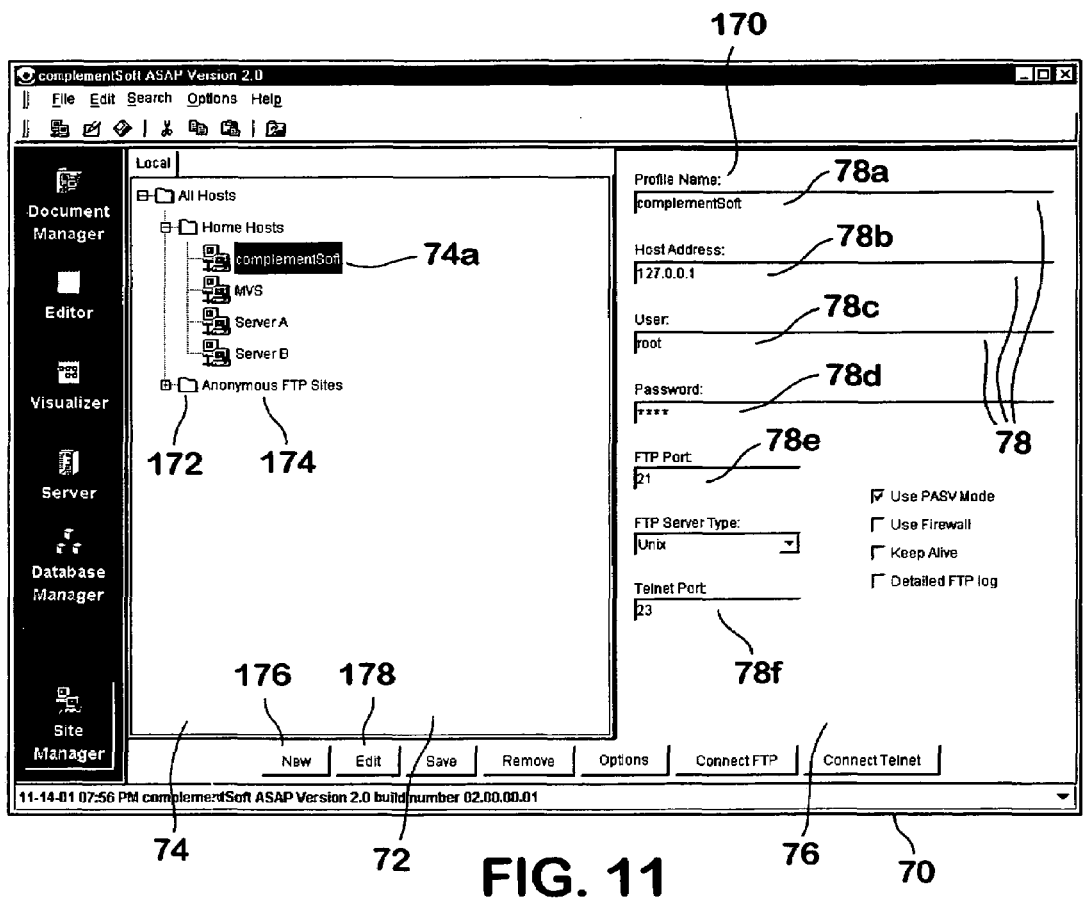
FIG. 11 is an exemplary screen shot depicting a site manager window.

The site manager 70 assists the local computer 22b with access to the remote computers 22a. For example, the document manager 60 and the server module 160 use the site manager 70 to collect the connection information 78 necessary for the local computer 22b to make a LAN/WAN connection to a remote computer 22a using either FTP, SFTP, Telnet SSH, HTTP, SHTTP, RSH, REXEC and other TCP/IP connectivity protocols. Additionally, to avoid manually entering the connection information 78 each time a different remote computer 22a is accessed, the site manager 70 is also capable of saving connection information 78 for different servers. Thus, the site manager 70 creates a virtual computing environment by expanding the computing boundary of the local computer 22b to include remote computers 22a and making various computing resources across the LAN/WAN seamlessly available for use by the local computer 22b. As shown in FIG. 11, the site manager window 72 may be divided into a first panel 74 and a second panel 76. The first panel 74 displays a tree structure that depicts the system configuration 74a for each of the remote computers 22a that are available to the local computer 22b. The second panel 76 displays the connection information 78 for a selected remote computer 22a, including but not limited to the following fields: Profile Name 78a, Host Address 78b, User 78c, Password 78d, FTP port 78e and Telnet Port 78f.

The site manager 70 also includes a PASV mode and Firewall option which can be selected by the user. PASV mode is supported as an option to allow file transfer programs ("FTPs") to work with a firewall. This feature reverses the connection between the remote computer 22a and the local computer 22b allowing many users whose sessions are hosted behind firewalls to use the document manager 60. Therefore, PASV mode is useful for certain types of firewalls that do not allow FTP servers to initiate data connections back to the connected client. If the Firewall option is selected, the firewall configuration parameters from the Firewall tab of the Option Dialog will be used to initiate a connection to this profile. Moreover, if the local computer 22b resides behind a firewall that limits or restricts FTP access and the Firewall mode is selected, the necessary connection information 78 and Firewall selections for the local computer 22b must be entered, i.e., a host name, port number, user ID and password. In accordance with procedures that are generally known in the art, the Firewall Type box permits the user to select the command required by the firewall to initiate an FTP session from the site manager 70. In addition to providing options that enhance the network connectivity of the local computer 22b, the Option button also provides tools and wizards for automatically searching the LAN/WAN for designated resources. These tools and wizards simplify the network/server connection setup between the local computer 22b and the remote computers 22a.

For parsing the code, the parser layer 140 is provided. The file parser 142 retrieves code utilizing the services provided by the document manager 60 and examines the words/tokens which comprise the code 144. The file parser 142 also identifies and tags the tokens 144 to indicate that they are one of a variety of token classes, such as, a keyword token, a newline token, a quotestring token, a macro token and a comment token. Since the integrated software application 30 is language aware, the parser layer 140 may accommodate varying language types. Thus, although the preferred embodiment of the present invention is specifically designed to include modules for parsing SASS® and SQL code, it should be appreciated that the modules can be included for parsing and interpreting other language types, such as, SPSS®, DB2 UDB® Store Procedures, ORACLE® PL/SQL, etc.

For managing and interacting with database files, a database manager 220 may be provided which automatically interacts with the local ODBC registry to display a list of ODBC resources. In addition, the database manager 220 may automatically search the LAN/WAN for RDBMS servers and display the list of RDBMS servers that are found locally or remotely. The database manager also allows the user to select and drill down to a desired database and automatically connect to the selected database, unless a login screen is required to connect to the database. Once connected to the selected database, the Database Manager will display a list of tables which are stored and available in the database. The user can then right-click on a particular table to gather statistics or to retrieve sample data from those tables. The user can also drill down on a particular table to display the columns of the tables. Similarly, the user can click on a particular table to gather statistics (e.g., frequency counts, min max, distinct value, average, etc.) or to retrieve sample data from those tables. The user can also drag and drop tables onto a work area to graphically generate SQL® statements to retrieve data from the database. Additional data manipulation functions, e.g., pivot, crosstab, and templates will be available to help users inspect, transform, import, export, map, format, transport and derive new data based on existing data. The database manager 220 may also include a meta data manager 222 to help the user document the business or logical definition of the data, and the technical or physical definition of the data. The meta data manager 222 may also assist the user in tracking the lineage of the data, i.e., the source of the data, the changes to the data that were made and the destination of the data.

To further exemplify the functionality of the integrated software application 30, the following section will discuss an exemplary software development session, along with the modules used to effectuate the respective functions.

This hypothetical session commences with activation of the integrate software application 30. Once the integrated software application 30 is launched, the graphical user interface 40 will be displayed and the user will have the opportunity to open modules in the navigation bar 48 or engage functions represented by buttons in the menu bar 42 or the tool bar 44. For determining to which computer the user desires access, the user would begin by activating the site manager 70, which causes the site manager window 72 to be displayed to the user. The site manager window 72 includes a first panel 74 and a second panel 76. As shown in FIG. 11, the first panel 74 of the site manager window 72 displays the defined/available remote computers 22a for the user's selection. As discussed above, the second panel 76 of the site manager window 72 displays a server profile for a selected remote computer 22a, comprising connection information 78, including, but not limited to, the following fields: Profile Name 78a, Host Address 78b, User, Password, FTP port 78e and Telnet Port 78f. As will be appreciated, the site manager can be configured to search the network for servers or certain types of servers and display the found servers for selection by the user.

The server profiles 170 may be populated by selecting a folder icon 172 to use as a parent directory 174. Once a parent directory 174 is opened, the user may click on the New button 176 to create a new server profile 170. Therefore, it should also be understood that the site manager 70 allows the user to create new server profiles 170 by entering the necessary connection information 78. To edit an existing server profile 170, the user must select a remote computer 22a and click the Edit button 178. After the Edit button 178 is selected, the cursor may be moved to the Profile Name 78a for editing or modification, or the user may click on the Option button for Advance Network/Server Connectivity Configuration Settings.

The text displayed in the Profile Name 78a field can be a profile name 78a that was selected in the first panel 74 of the site manager window 72 or text the user enters in creating a profile for a remote computer 22a or host. The Host Address 78b field may contain an IP address or a resolvable DNS host name of the FTP, SFTP, Telnet, SSH, REXEC, HTTP, or SHTTP server for the respective host definition. The User 78c field may contain the login name that the user will enter to access the remote server computer FTP account. If the selected remote computer 22a accepts anonymous FTP requests, "anonymous" may be entered in this field. The Password 78*d* field may contain a password 78*d* for the remote server computer FTP account, unless an anonymous login is used; then, the Password 78*d* field may remain blank. The FTP port 78*e* field is set by default to 21, since most server computers 22*a* accept FTP connection requests on port 21, however, the FTP Port 78*e* field may be changed as needed. The Telnet Port 78*f* field is set by default to 23, since most server computers 22*a* accept Telnet connection requests on port 23, however, the Telnet Port 78*f* field may also be changed as needed.

Once the user selects a remote computer 22*a* to access, the connection information 78 for the selected remote computer 22*a* is returned by the site manager 70 and displayed to the user. Then, the user is given the option of connecting to the selected remote computer 22*a* by selecting the Connect Telnet button. When the Connect Telnet button is selected, the server module 160 is activated. To connect to the remote computer 22*a*, the server module 160 utilizes the connectivity layer 180. More specifically, as is known in the art, the connectivity layer 180 utilizes the connection information 78 with TCP/IP and other similar networking protocols to interconnect with the remote computer 22*a*. Once the server module 160 has made an initial connection with the selected remote computer 22*a*, a server module window 162 is displayed to the user. The server module window 162 displays the name of the remote computer 22*a* to which the user is trying to connect.

Prior to opening a session on a particular host, the user may be required to login or the server module 160 may automatically log the user on (depending on the settings that the user has selected in the server profile 170, i.e., save login and password). FIG. 10 shows a server module window 162 that is configured for automated login, with a home path preset to the integrated software application's SAS® directory. The combination of the site manager 70, the server module 160 and the connectivity layer 170, enable the user to seamlessly access SAS® documents, log files and output files stored at the remote computer 22*b*.

Figure 12:
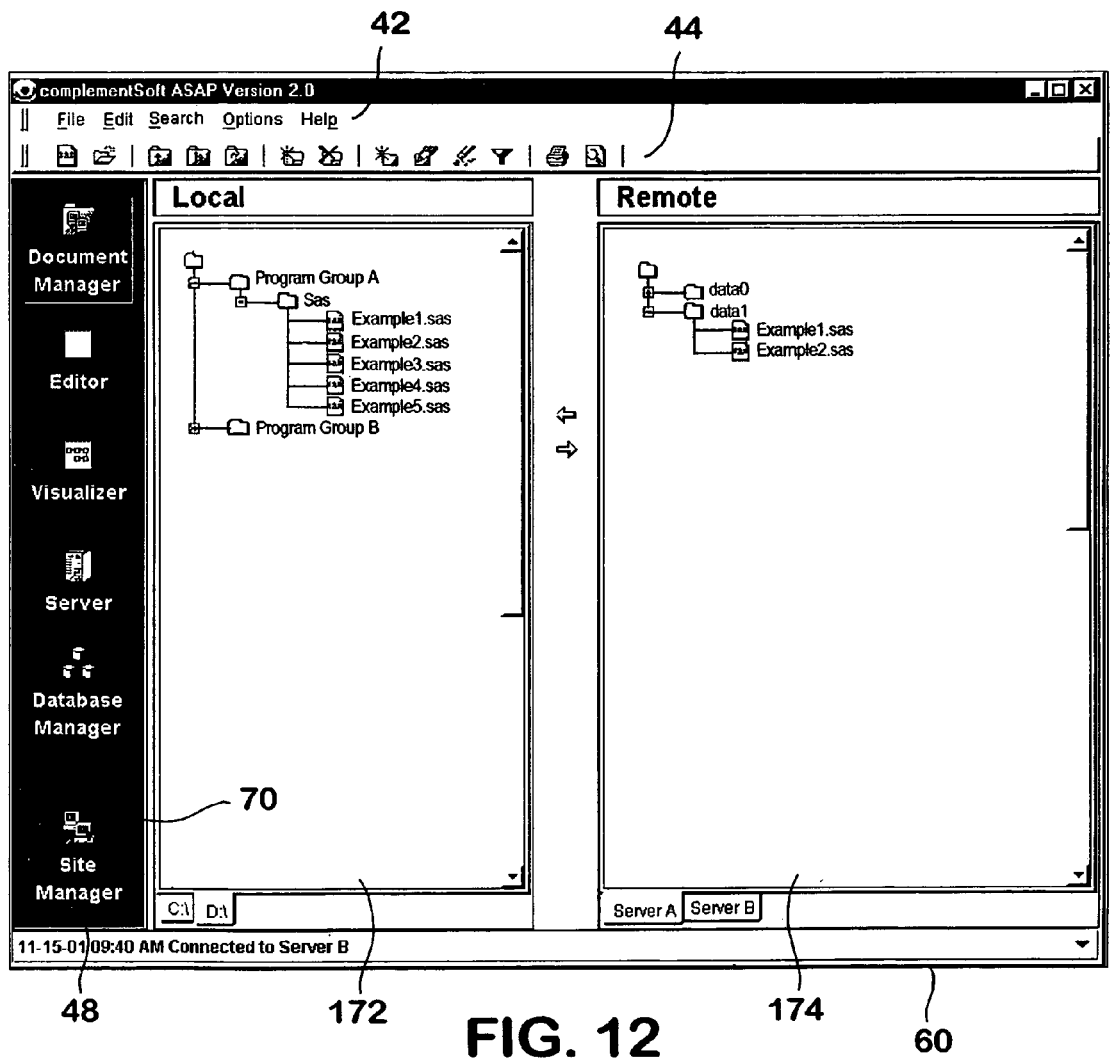
FIG. 12 is an exemplary screen shot depicting a document manager window.

Once the local computer 22*b* accesses a remote computer 22*a* using the combination of the site manager 70, the server module 160 and the connectivity layer 170, the document manager 60 will be activated automatically. Moreover, to view the available files for a selected computer, the document manager window 170 may be displayed to the user. As shown in FIG. 12, the document manager window 170 includes a local panel 172 and a remote panel 174. Each of these panels, 172, 174 displays the available files for the respective computers 22*b*, 22*a* as a file tree structure, as shown in FIG. 12. The user may then select one or more of the available files for editing or visualizing. In the preferred embodiment of the present invention, files that are located in the local panel 172 are resident on the local computer 22*b* and files that are located in the remote panel 174 are resident on the remote computer 22*a*, but it should be appreciated that such designations are for explanatory purposes only and that other variations of network systems and computer designations could be employed.

Figure 13:
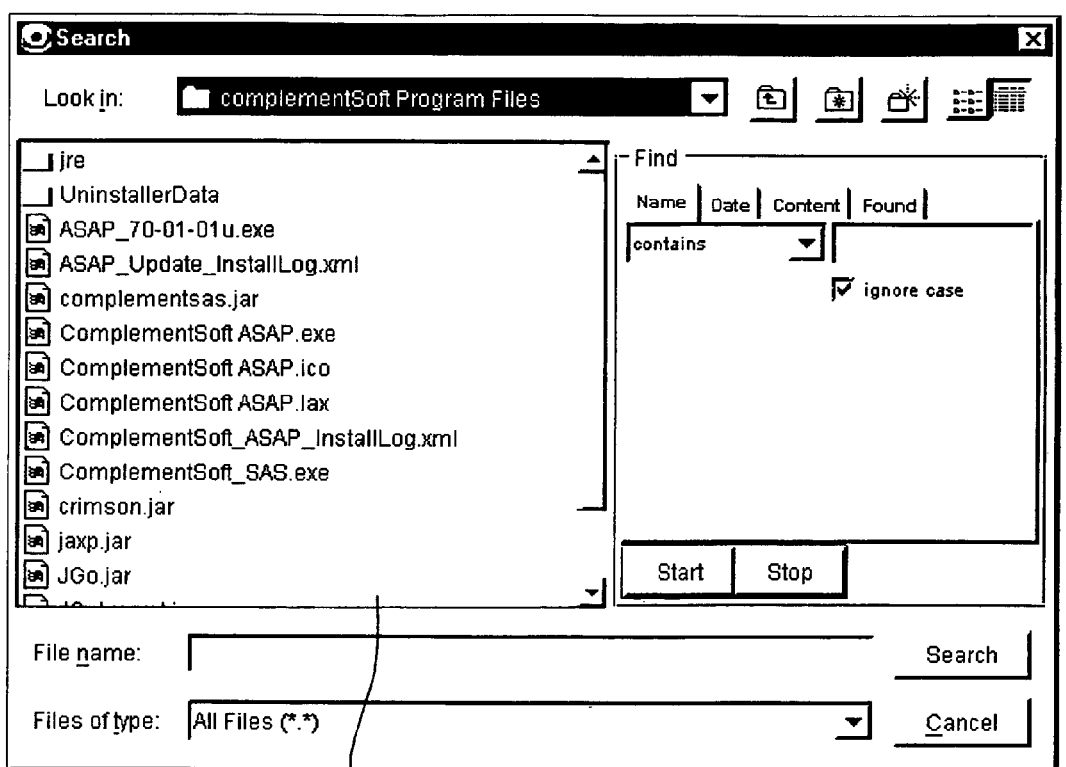
FIG. 13 is an exemplary screen shot depicting a search panel for locating files.

The document manager 60 also allows the local computer 22*b* to perform various Windows® commands, such as, creating new files, renaming, deleting and opening existing files, printing files, copying, cutting and pasting information to the Windows® clipboard, and other standard commands that are generally known in the art. In addition, the document manager 60 provides a Search Option 69. As shown in FIG. 13, selecting the Search Option 69 opens the search option window 69*a* and allows users to search any file system that is accessible to the local workstation/local computer 22*b*, in accordance with generally known file searching techniques, including by exact or partial file name, modification date or date range, and content.

To open a file displayed in the local panel 172, the user may double-click on the selected file, or highlight the selected file and start the desired module (i.e., the editor 80 or the visualizer 120). If the user double-clicks on a file located in the local panel 172, the editor 80 will automatically open and display the file. To open and edit a file displayed in the remote panel 174, it is preferable that the user drag a selected file from the remote panel 174 of the document manager 60 and drop the selected file in the local panel 172 of the document manager 60. It should also be understood by those with skill in the art that other methods for opening and moving files may be employed.

To retrieve a file that is stored on a remote computer 22*a*, the document manager 60 may utilize a file transfer program 64, in connection with the site manager 70 and the connectivity layer 180. For example, as is known in the art, the document manager 60 may send a request to the file transfer program 64 to import the selected file from a particular remote computer 22*a*. In response to this request, the file transfer program 64 may communicate with the remote computer 22*a* via the connectivity layer 180 and instruct the remote computer 22*a* to send the selected file to the local computer 22*b*. When the selected file is being transferred from the remote computer 22*a* to the local computer 22*b*, the intelligent module 62 of the document manager 60 may compile file transfer information 64, as noted above. It should also be understood that, while it is preferred to have the intelligent module 62 compile file transfer information 64, other similar modules may be equally capable of accomplishing the task of compiling file transfer information 64 for the system 20.

Again, for exemplary purposes only, it is assumed that the user has chosen to edit the code before visualizing it. As mentioned above, to begin editing files, the user may either double-click on the selected file, which automatically opens the editor 80, or the user may highlight the selected file and then open the editor 80. To open the editor 80, the user need only double-click on the Editor button 48*c* located in the navigation bar 48 of the graphical user interface 40, as shown in FIG. 3.

As shown in FIG. 6, once the editor 80 begins the editing process (the default setting is Full Screen mode), the contents of a selected file are returned from the document manager 60 and displayed to the user beside a navigation bar 48 bar. For editing the code and implementing advanced code-handling capabilities, the editor 80 also includes features, such as, language-aware syntax highlighting, warning and error log file highlighting, automatic line numbering, automatic completion of code segment based on program templates, tree views of program blocks and code templates 106. By highlighting key code statements, the language-aware syntax highlighting makes the code easier to read and edit. In addition, by highlighting the code, based on information contained within the warning and error log files, errors in the code are more apparent and the code is easier to trouble-shoot.

To allow the user to customize, edit and maintain error messages and the corresponding debugging hints, the message manager 88 is provided. More specifically, the message manager 88 allows the user to create, update and delete error messages. For example, the user can click on any error message in the log and in response to this selection, the message manager 88 may compare the selected error message to an existing repository of error messages The repository of error messages can be stored locally and/or centrally in a remote server accessible and sharable by the entire workgroup or the entire enterprise. If the selected error message matches one of the existing error messages, a debugging window will pop-up. The debugging window will display the original error message, along with any corresponding debugging hints that are associated with the original error message as provided by the message manager 88. If the selected error message does not match one of the existing error messages, the message manager 88 may automatically read the new message into the repository of error messages. Additionally, the user may have the option to associate debugging hints with the new error message.

Figure 14A:
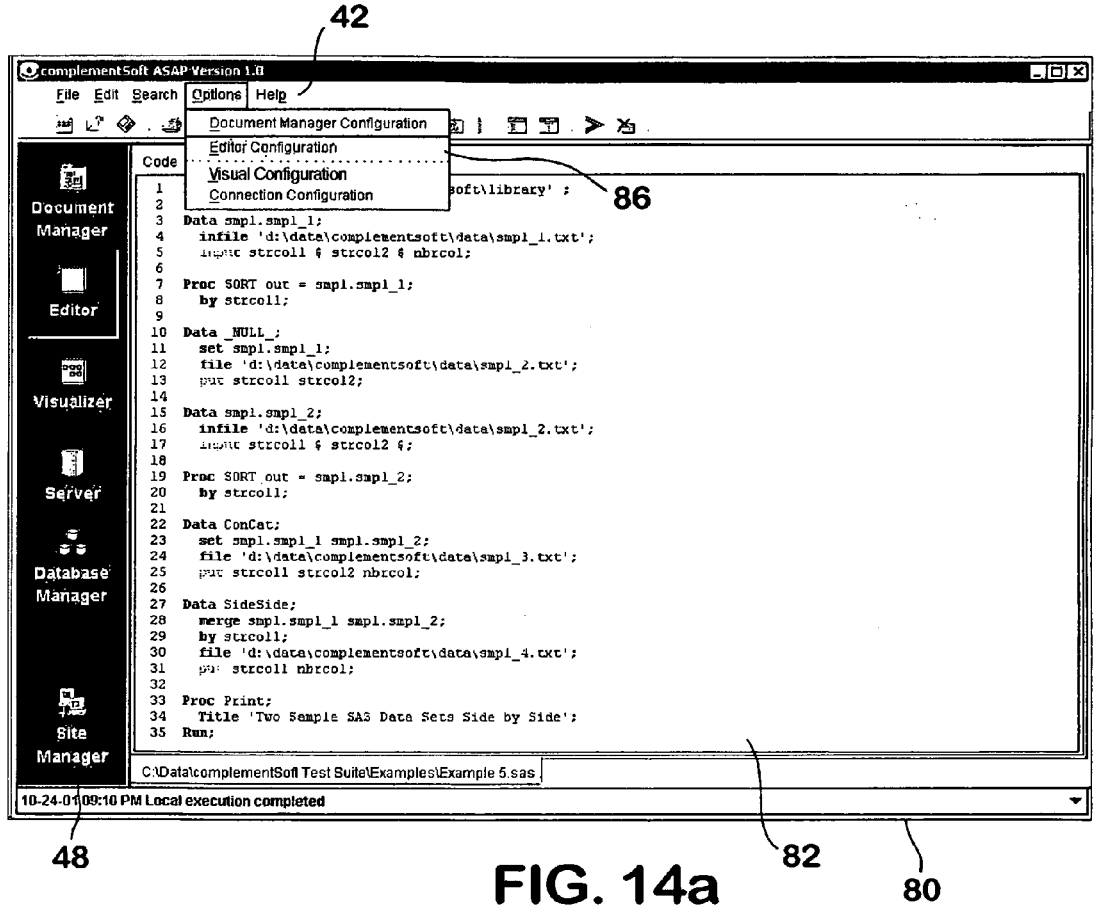
FIG. 14a is an exemplary screen shot depicting an Enhanced Editor Options window.
Figure 14B:
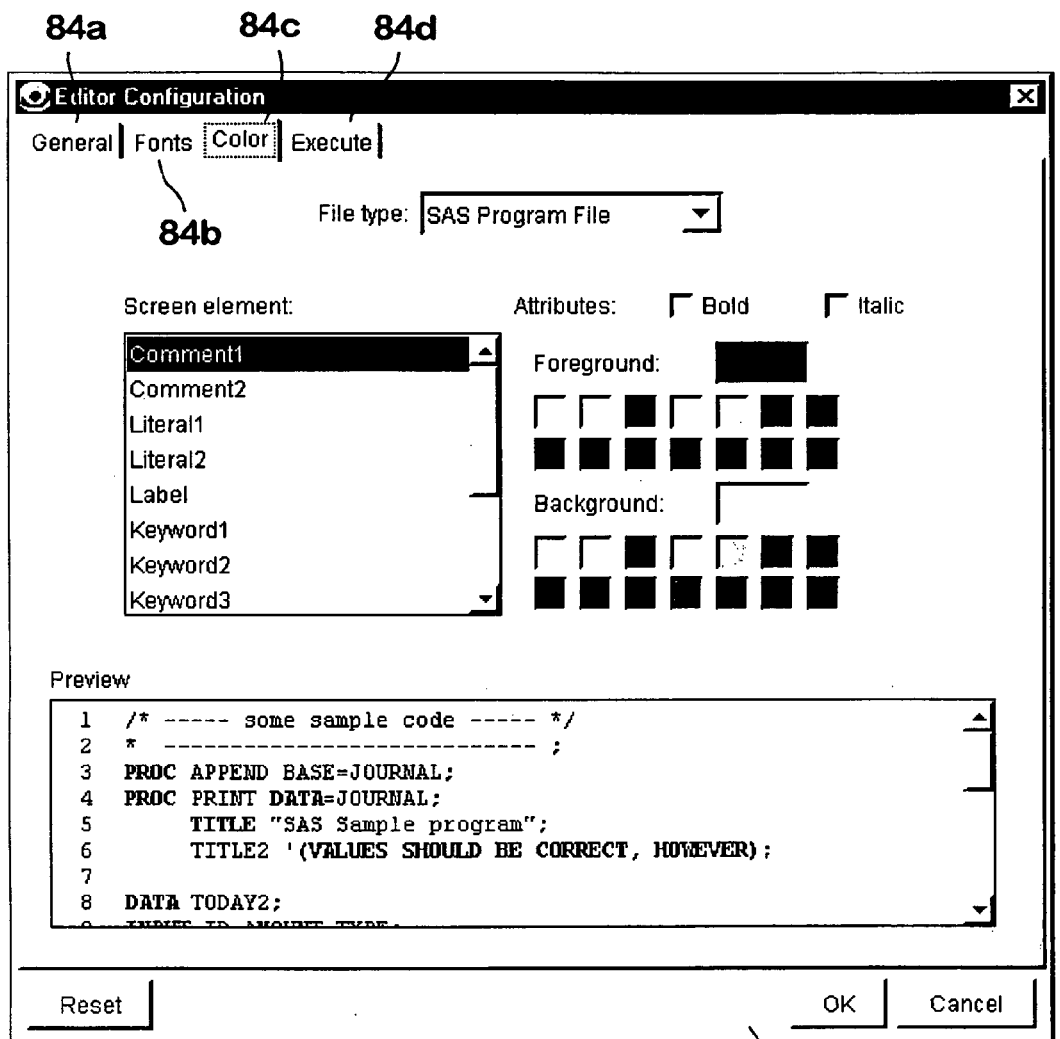
FIG. 14b is an exemplary screen shot depicting a Color tab window for customizing the font colors associated with the code displayed by the Editor.
Figure 14C:
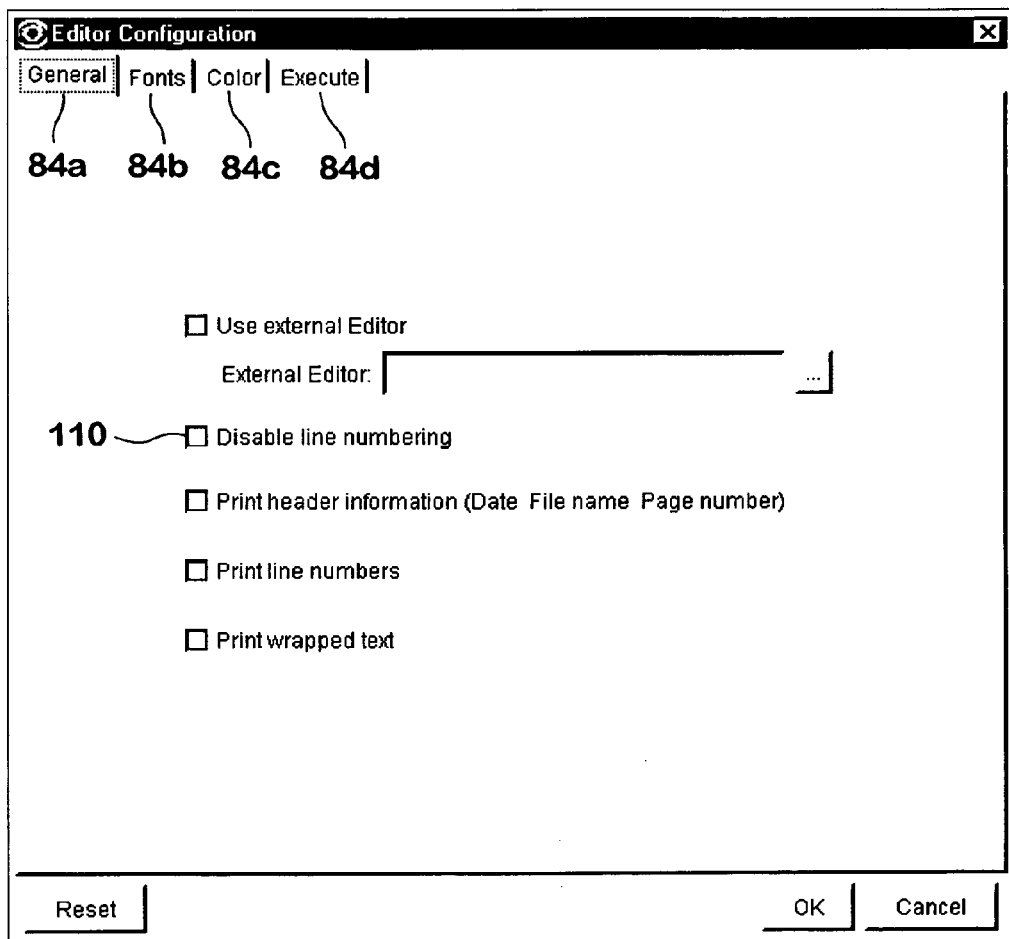
FIG. 14c is an exemplary screen shot depicting a General tab window for configuring the usage of an external editor in-lieu of the built-in editor, enabling and disabling line numbering for the code displayed by the Editor, and selecting print options.
Figure 14D:
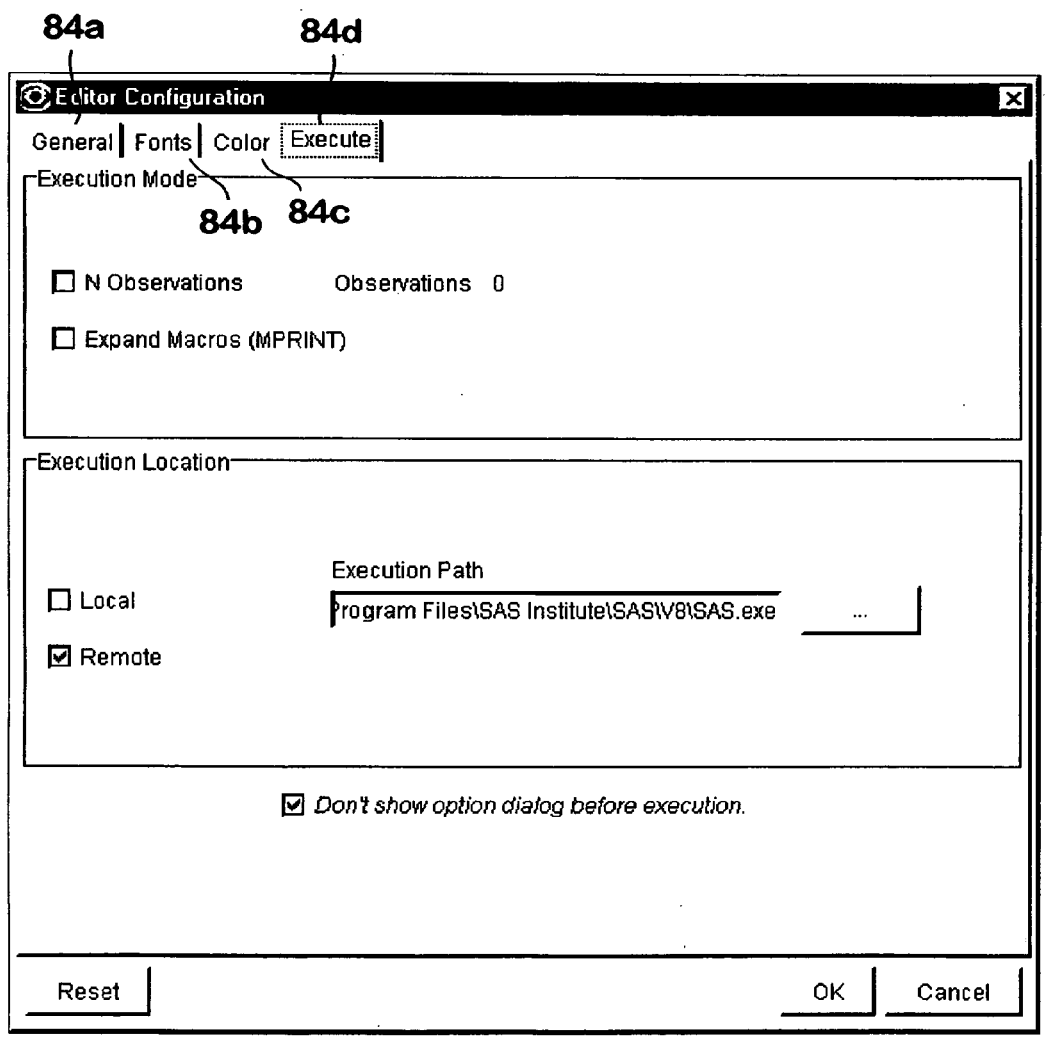
FIGS. 14d&e are exemplary screen shots depicting an Execution Configuration tab for configuring the execution mode and execution location for selected files.
Figure 14E:
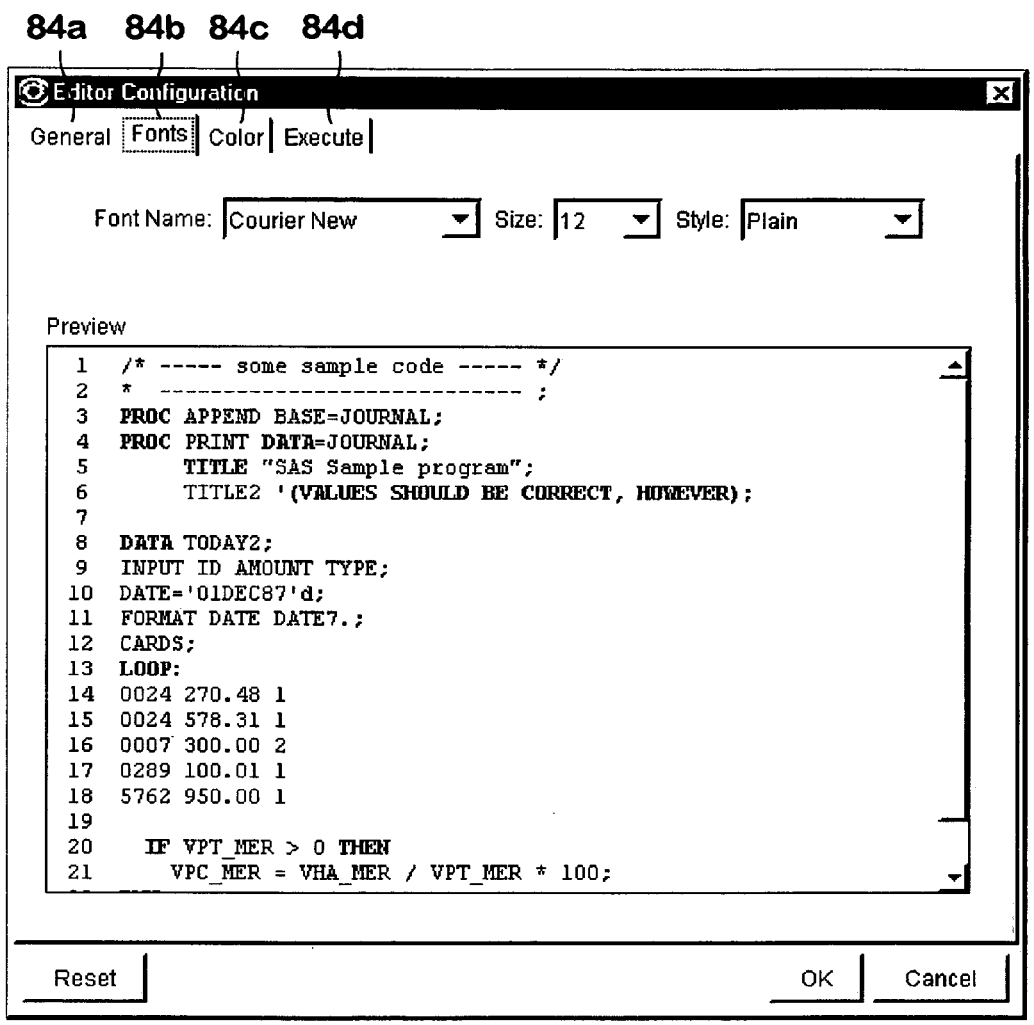

To further add to the utility of the editor 80, the user can open the Enhanced Editor Options window 84 by clicking the Editor Configuration button 86 in the Options pull-down menu. The Enhanced Editor Options window 84 is further comprised of a General tab 84a, a Font tab 84b, a Color tab 84c and an Execution tab 84d. As is generally understood in the art and as shown in FIG. 14a, the font type, size and style of the code may also be customized by the user by selecting the Font tab 84b in the Enhanced Editor Option window 84. Additionally, as shown in FIG. 14b, the Color tab 84c of the Enhanced Editor Options window 84 may be selected to allow the user to select the colors that are used in connection with various syntactically significant language elements in the SAS® program file, thereby allowing the user to customize the language-aware syntax highlighting and warning and error log file highlighting functions. To further configure the user workspace, the editor 80 allows the user to choose whether or not to display line numbers in connection with editing the code. For example, as shown in FIG. 14c, the General tab 84a can be selected by the user and may provide options for selecting a line numbering button representative of disabling or enabling the line numbering, specifying printing options or indicating the use of alternate editor. For allowing the integrated software application 30 to configure the execution path for selected files, the Execution tab 84d can be selected by the user and the execution mode and execution location may be defined (i.e., Locally or Remotely), as illustrated in FIGS. 14d&e. By configuring the execution path for selected files, the user can execute the code on local or remote computers 22b, 22a or engines.

Once the selected code is displayed on the editor window 82, the user can begin to edit the code. Although the default setting for the editor window 82 is the Full Screen mode, the user can also select a Split Screen mode. The Split Screen mode splits the editor window 82 into two panels, i.e., the tree view panel 82a and the code view panel 82b. To enhance the ability of the user to navigate within the body of the code, the tree view panel 82a displays the tree view 90, which is comprised of a group of active elements 92. The tree view panel 82a displays a high-level representation of the code and the code view panel 82b displays the corresponding code that is associated with a highlighted active element 92. To this end, the editor 80 works in connection with the parser layer 140 to parse the code in a manner that allows the editor 80 to display a tree view 90 comprised of active elements 92 that are representative of code section that perform important functions, such as, the introduction of new variables or the execution of append, print or similar functions. Thus, the user can navigate through the code by clicking on the desired active element 92, which causes the code that corresponds with that active element to be displayed in the code view panel 82b.

The user can also add pre-existing code to the program being edited, by opening the template manager 100. The template manager 100 allows the user to select existing templates 106 and to integrate the code associated with those templates 106 into the code by simply clicking on the paste button or by utilizing standard cut and paste tools, or similar functions, as will be explained in greater detail below.

Once the template button 44a is selected, the template manager 100 is activated and the template manager window 101 is opened. It should be appreciated that the template manager 100 may be a separate browser; therefore, the template manager window 101 may remain open throughout the users session. The template manager window 101 may be further comprised of a template directory panel 101a and a template code panel 101b. The template directory panel 101a may display a directory 104 of template folders 105 or available templates 106. To display the code associated with an available template 106, the user may select a file folder containing available templates 106 from the directory 104 and select an available template 106, which is located within the selected file folder. Once a template 106 is selected, the template code 106a associated with the template 106 is returned to the template manager 100 and displayed in the template code panel 101b.

To insert the template code 106a associated with a selected template 106 directly into the code that is being edited, the user may click the Copy button 102 on the template manager window 101; this places the template code 106a associated with the selected template 106 into the Windows® clipboard. Then, the user should place the cursor in the desired location within the code and select the Paste button 103. Or the user may simply click the paste button and the template will be copied directly into the current location of the cursor in the document.

Figure 15:
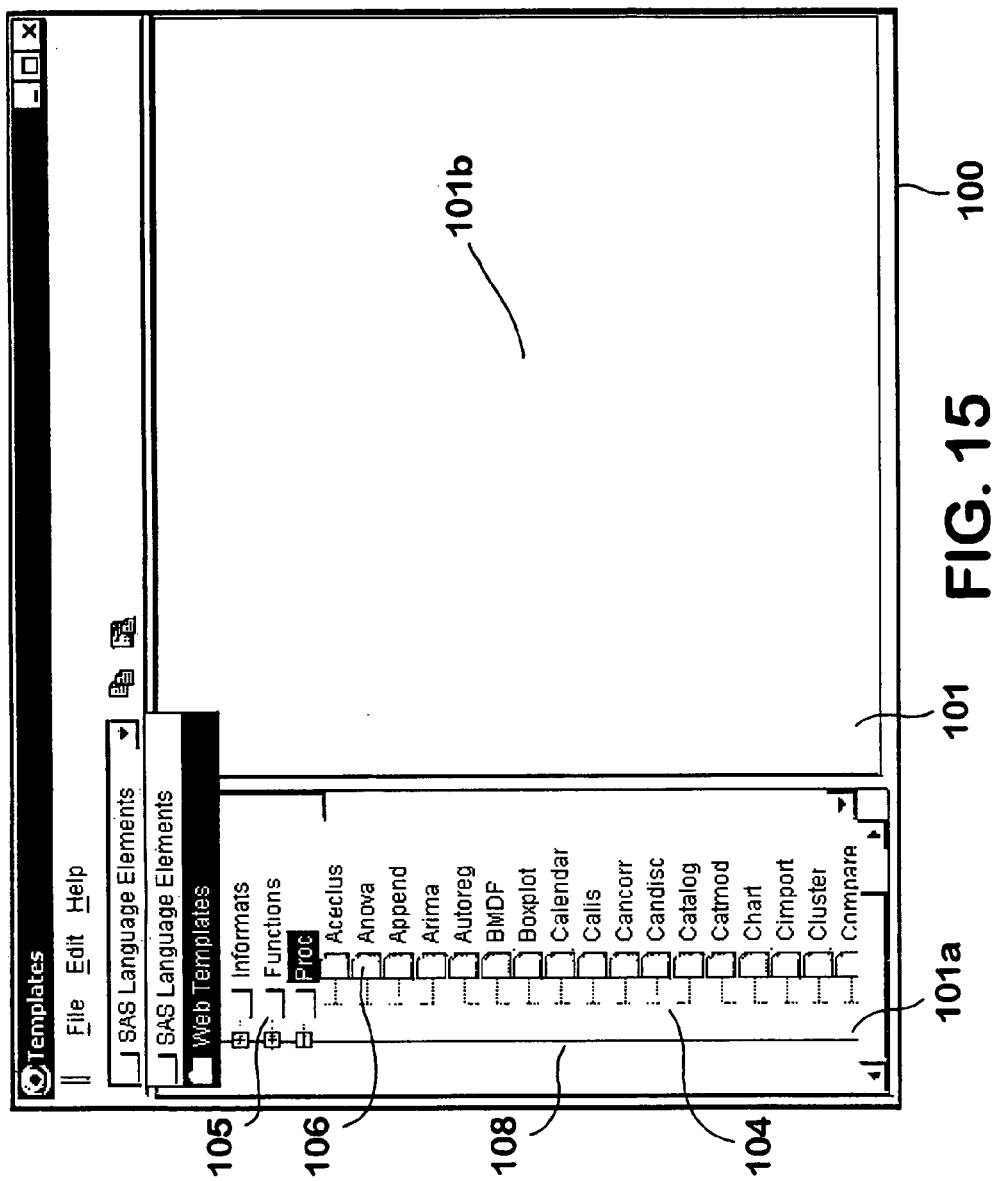
FIG. 15 is an exemplary screen shot depicting the template window as it is displaying available web-based templates to the user.
Figure 16:
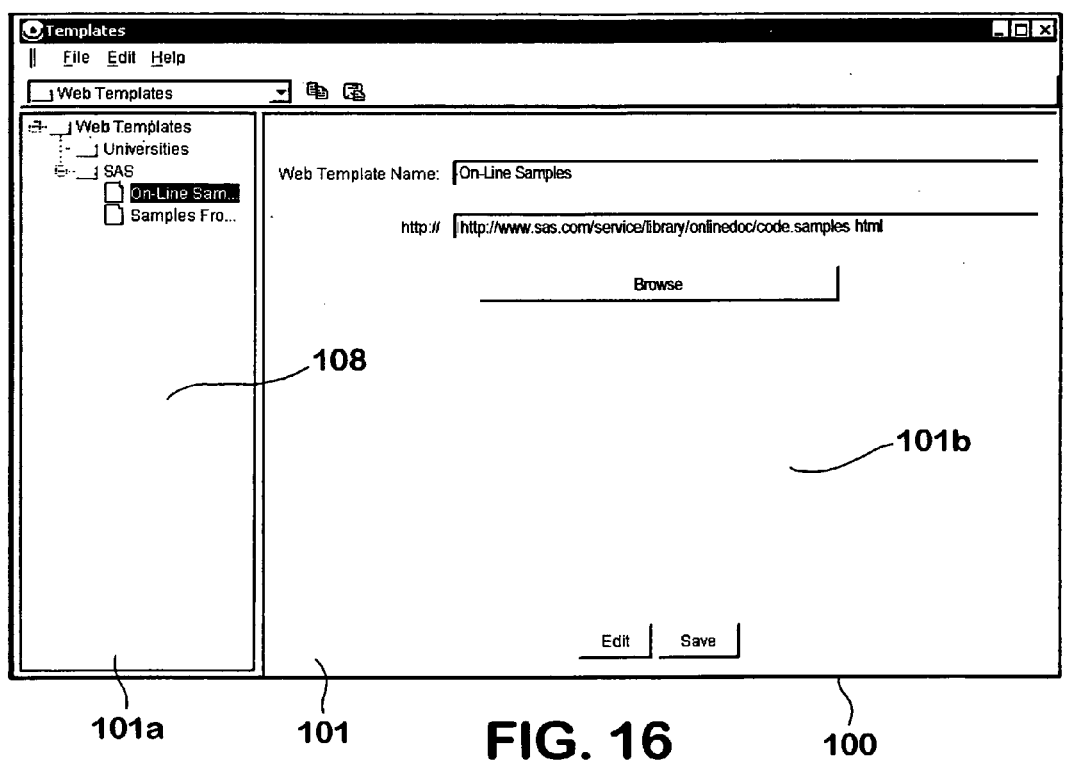
FIG. 16 is an exemplary screen shot of a web-based template that is already configured.

The template manager 100 may also allow the user to create new template folders 105 for storing templates 106, to create new templates 106 and to edit existing templates 106. These templates can reside on either the local drive or the network drive. In addition, for allowing the template manager 100 to import additional templates 106 from remote computers 22a, the template manager 100 also enables the user to browse web-based templates 108. As shown in FIG. 15, once the web-based templates 108 are accessed and displayed on the template manager window 101, the web-based templates 108 may be utilized in a manner similar to the templates 106. As shown in FIG. 16, additional web-based templates 108 may be added to the template manager 100 by the user. It should also be understood that the templates 106 are web enabled, i.e., the user can associate links or URLs with the template during creation. Thus, users may be capable of clicking on a link and causing the template manager 100 to automatically activate a web browser to display any content associated with the link.

Figure 23:
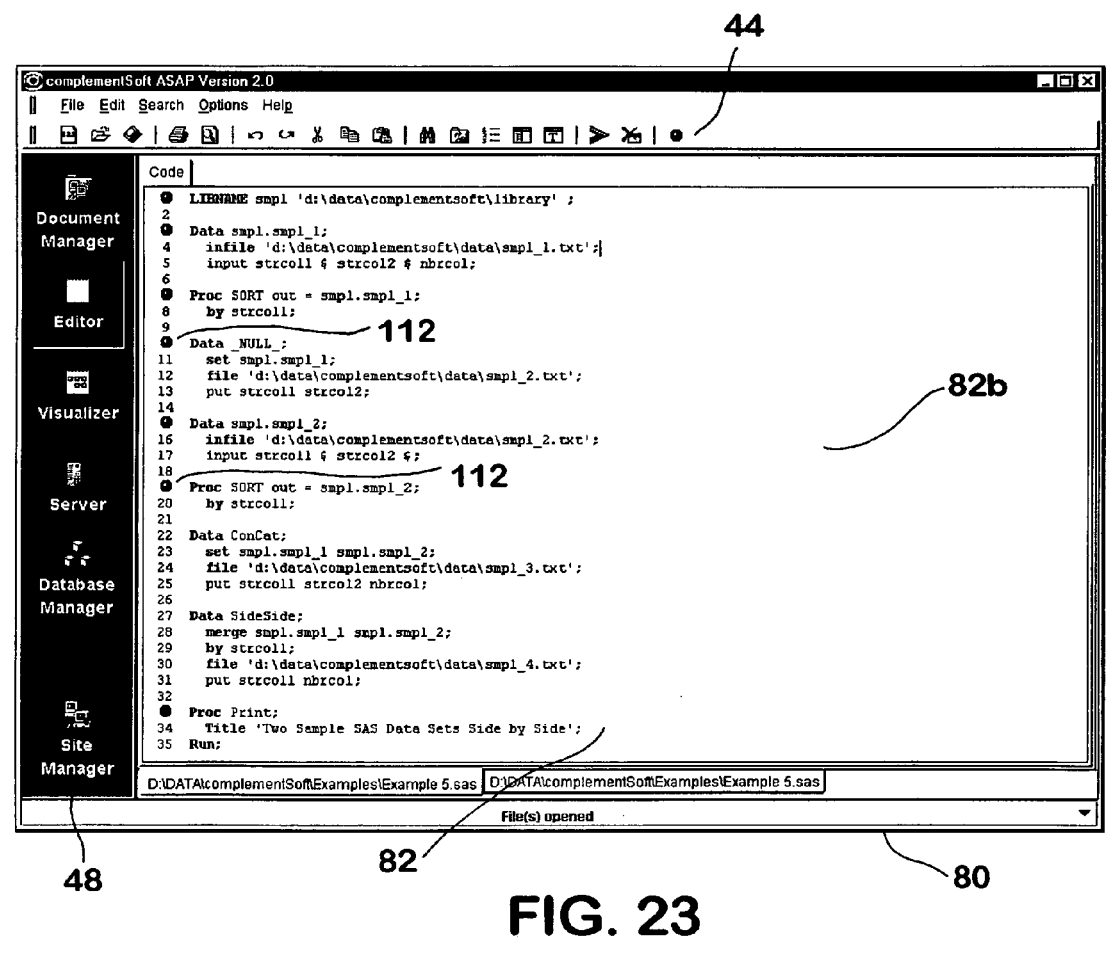

Once the user has completed the editing or development of the code, the user can execute and debug the code. In addition, the code can be executed locally or remotely. As is known in the art, the user may also use the editor 80 to set break points 112 in the code. As shown in FIG. 23, break points 112 can be set by selecting the line numbers that correspond to the intended location of the break points 112. It should also be appreciated that by setting break points 112 in the code, the code can be executed in its entirety or as a block of code with the additional option of skipping specified code segments within the selected blocks.

The site manager 70, the document manager 60 and the editor 80 work in conjunction with one another to execute the code. For example, the site manager 70 manages the connections between the local computer 22b and the remote host/remote computer 22a; the document manager 60 tracks the associations between the code, the log files and the output files that are generated and the remote system on which the code is to be executed; and the editor 80 allows the user to modify the code. Moreover, for assisting users in developing and maintaining software, the editor 80 and the visualizer 120 have an integrated relationship. For example, each of the active elements 92 displayed in the tree view 90 may also be represented in the visualizer 120 and any changes made in the editor 80 can be simultaneously reflected in the visualizer 120.

To execute code remotely when the code resides on a remote computer 22a, the code is first copied to a directory on the local computer 22b. Next, the user should open the local copy of the code. After the local copy is opened and returned to the editor 80, the code view panel 82b will display the code. The user can also use the document property wizard to specify the server and the location in which they intend to execute the code. The server or location may be selected by browsing the server list in the site manager 70.

To execute code remotely when the code resides on a local workstation/local computer 22b, the user first instructs the site manager 70 to make a connection to the remote computer 22a. Then, the user may cause the document manager 60 to copy the code from the local computer 22b to a directory 104 on the remote computer 22a. To select code for execution, the user can drag an icon representing the selected code from the local panel 172 of the document manager 60 window and drop the icon in the remote panel 174 of the document manager 60 window. It should also be appreciated that the selected code could be copied by other means that are generally known in the art. Next, the user should open the local copy of the code. After the local copy is opened, the editor window 82 will display the code.

To execute the code or code segments, the user selects the Execute Program button 44a on the tool bar 44 or in the Right-Click menu. Once the Execute Program button 44a is selected, the server module 160 connects to the proper computer 22a, 22b using the connectivity layer 180 and causes the execution script, which may be defined in the site manager 70, to operate on the selected code. After execution of the code is complete, a system prompt will be displayed. The user may then type "exit" to return to the editor 80 window; the document manager 60 automatically transfers the session's .log an .1st files to the same directory 104 from which the code was copied and displays them as separate tabs on the Editor 80 window. The user can also configure the remote execution function to that it will exit automatically.

Figure 17:
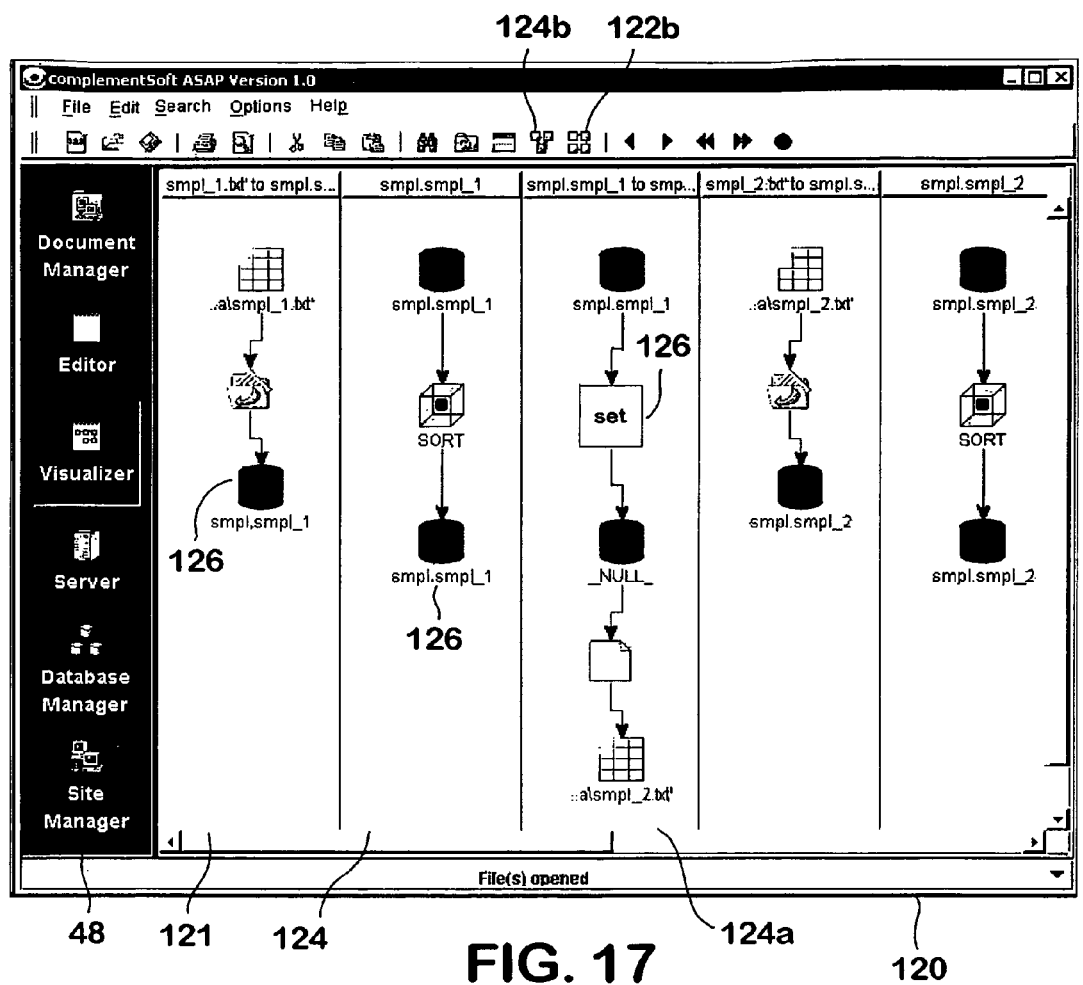
FIG. 17 is an exemplary screen shot depicting a data flow for a selected file.

As shown in FIGS. 9 and 17, the visualizer 120 may be used to show the program flow 122 or the data flow 124 of the selected code on the visualizer window 121. Additionally, the user will be able to toggle between the program flow display 122a and the data flow display 124a by selecting the View Program Flow button 122b or View Data Flow button 124b, respectively. As shown in FIG. 9, the program flow 122 is displayed as a default and displays program flow icons 126, which are graphical representations of code sections, in the order that they occur in the code.

For generating the program flow icons 126, a document view engine 200 is provided. The document view engine 200 operates in conjunction with the parser layer 140 to parse the code. Using information provided by the parser layer 140, the document view engine can intelligently recognize and arrange individual procedures and data blocks on the visualizer window 121 and represent the procedures and data blocks as program flow icons 126. The document view engine 200 may also allow users to assign meaning and attributes to tokens 144, which are identified by the parser layer 140. By assigning meanings and attributes to tokens 144, the document view engine 200 allows the visualizer to create program flows 122 and data flows 124.

Figure 18A:
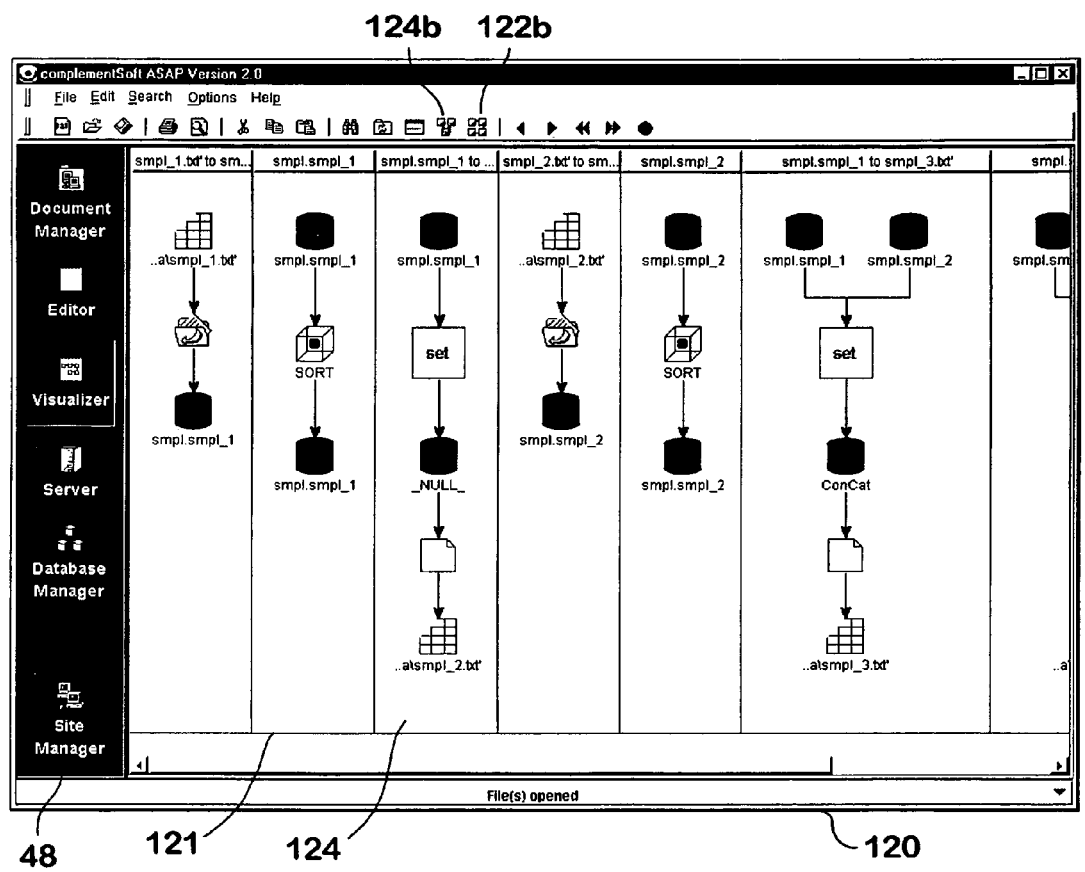
FIG. 18a–c are a series of exemplary screen shots depicting operation of a step-wise function and various data flows as the data flows are being collapsed.
Figure 18B:
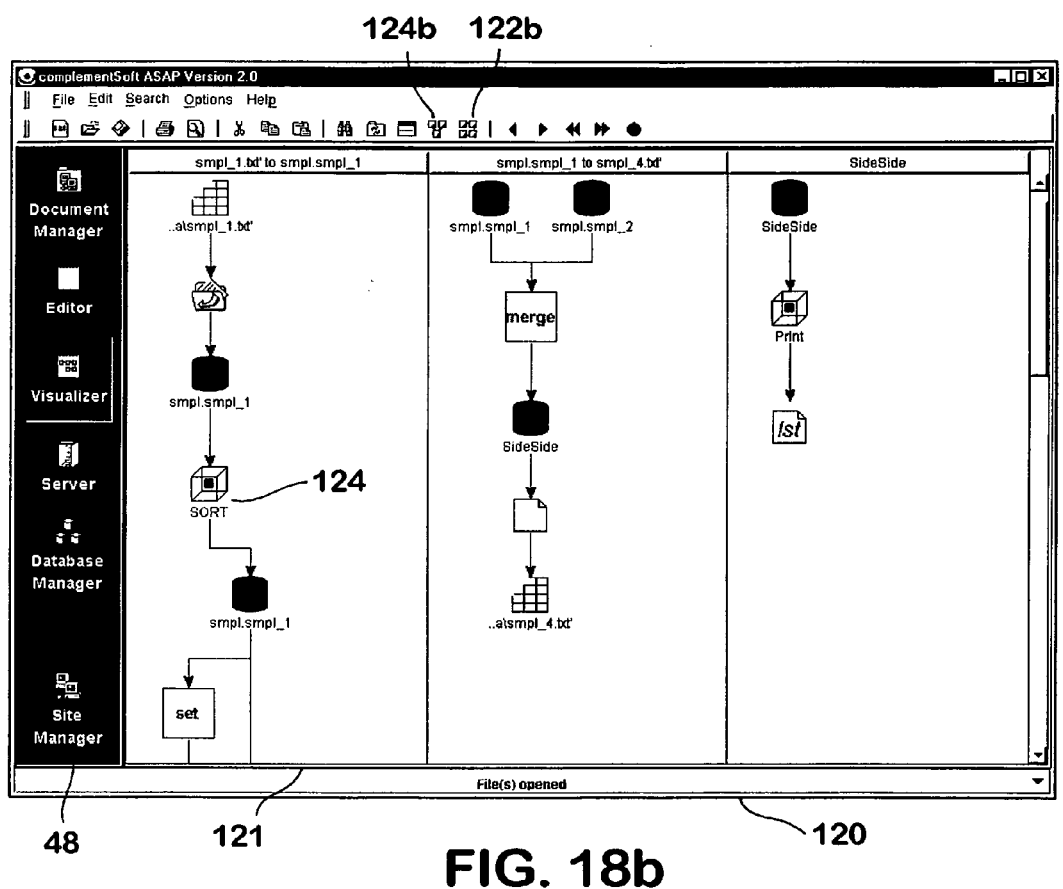
Figure 18C:
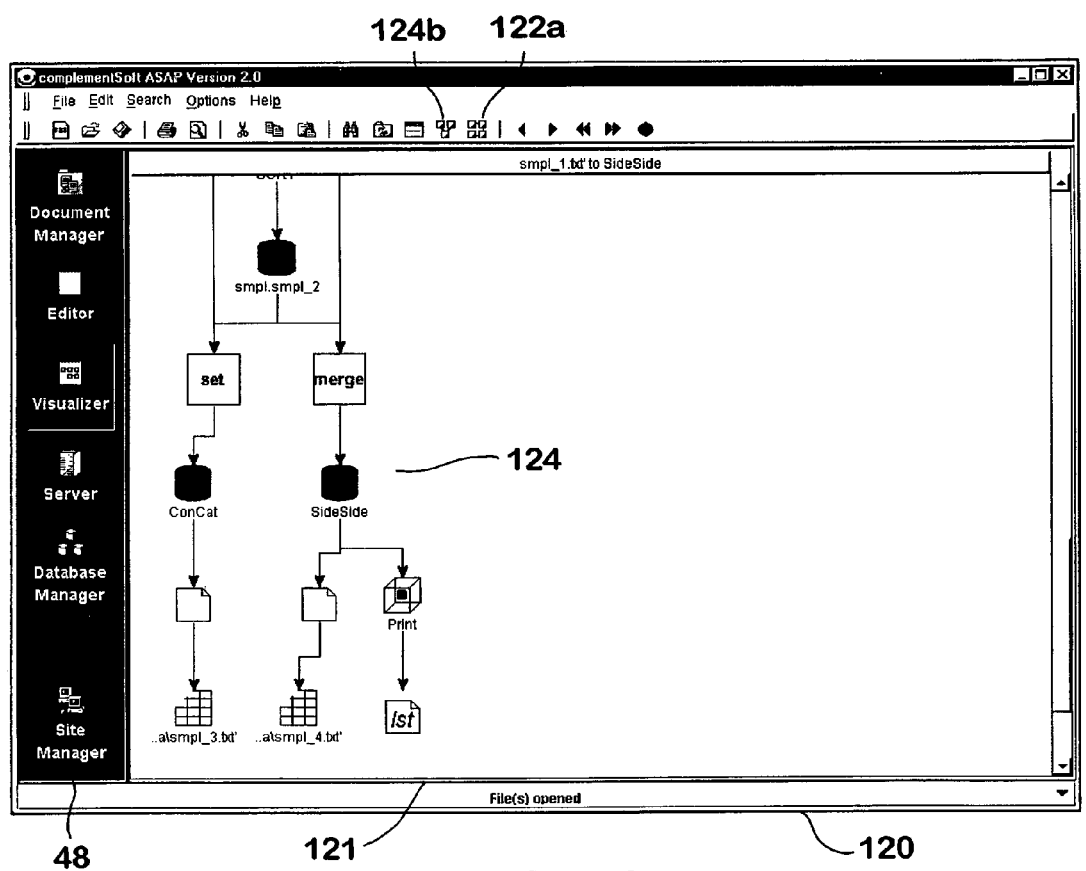

As shown in FIG. 17, the visualizer 120 may also show the data flow 124 of the subject code. The data flow 124 is generated by parsing the code, tracing the flow of the data through the code and displaying individual processes and data blocks in separate columns with arrows that connect the program flow icons 126 and indicate the direction of the data flow. In addition, as shown in FIG. 18, the data flow visualizer also allows the user to combine flows in a stepwise manner, thereby following the flow of the data from start to finish. As the user clicks the Step-wise button 121a located on the visualizer window 121, shown in FIG. 17, the visualizer 120 and the document view engine 200 may re-generate the data flow 124a on the visualizer window 121 and collapse the number of program flow icons 126 that comprise the data flow 124, ultimately showing the entire lineage of the data (i.e., where the data came from, how the data has been processed and where the data was stored). Thus, the visualizer 120 enables the user to view a representation of the flow of data during execution of selected code one step or program statement at a time. It should also be appreciated that the user may take a single data flow 124 and reverse the step-wise function, thereby expanding the number of program flow icons 126 that comprise the data flow 124 and showing the data flow 124 for individual sections or blocks of code.

It should also be appreciated that the integrated software application 30 allows changes to the code to be made textually or visually, i.e., by using the editor 80 or the visualizer 120, respectively. Editing, creating or developing new code visually using the visualizer is achieved by reverse engineering the exiting code or code templates, i.e., SAS®, SQL®, SPSS®, DB2 UDB®, Oracle® RDBMS and UNIX® Scripts, and displaying the code visually using icons. As the user manipulate these icons visually, code will be generated. Any changes to the code via the visual interface can be forward engineered to assume a textual format capable of being executed on the respective Data Development and Data Management System. Therefore, the integrated software application 30 is capable of producing a textual file that is derived from a visual model and executing the derived textual file.

Figure 19:
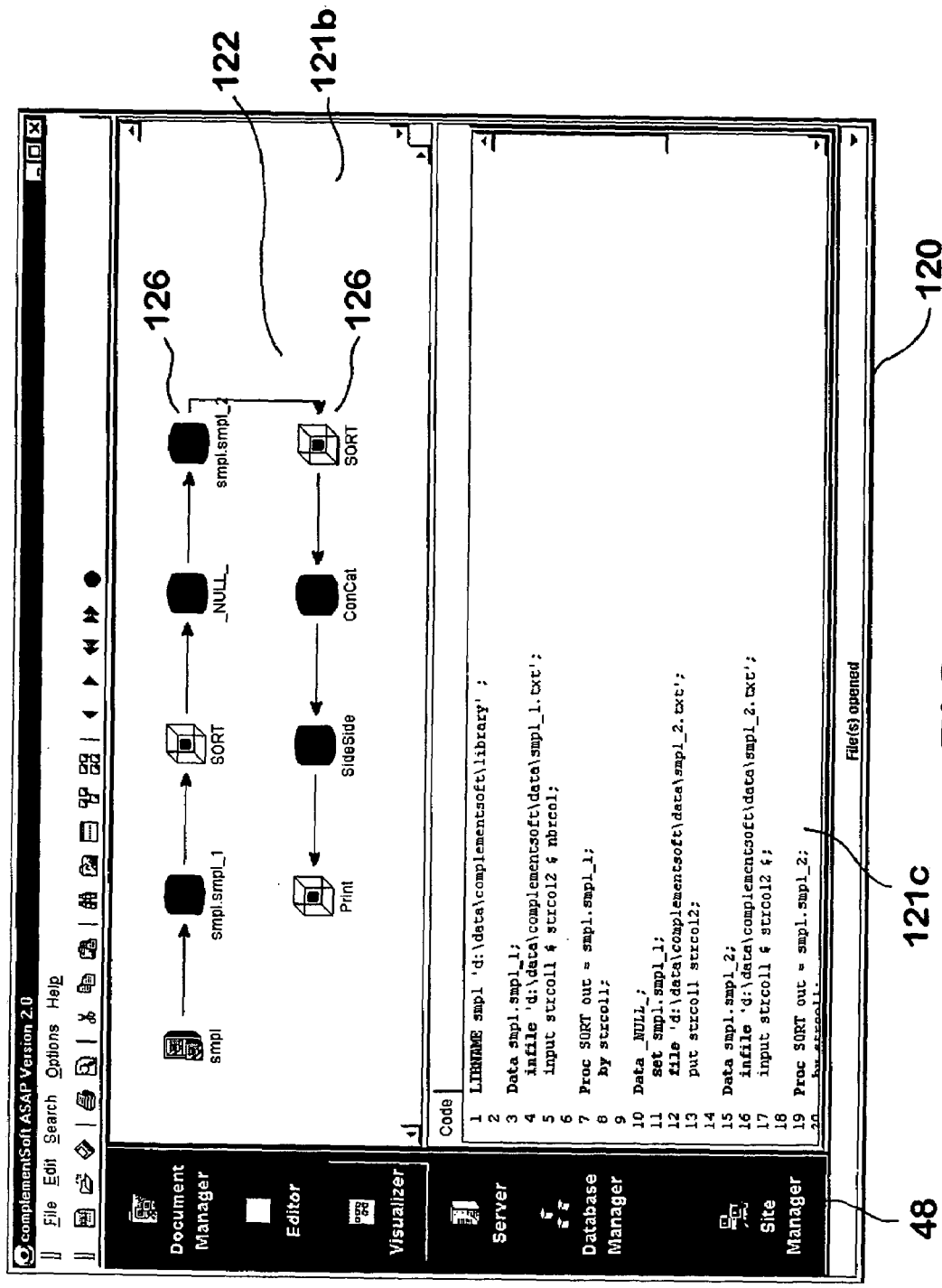
FIG. 19 is an exemplary screen shot depicting the visualizer employing the Split Screen view.

As shown in FIG. 19, the visualizer window 121 may also be configured to display a split view. When the visualizer window 121 is in split view mode, the visualizer window 121 will be comprised of a flow panel 121b and an visualizer code panel 121c. The flow panel 121b will display either the program flow 122 or the data flow 124, and the visualizer code panel 121c will display the code for program flow icons 126, which are shown in the flow panel 121b. Moreover, by clicking on an icon in the program flow window or data flow window, the user can cause the editor 80 window 100 to display the portion of the code that corresponds to the program flow icon 126 that was selected. This is especially helpful in debugging the code.

Figure 20:
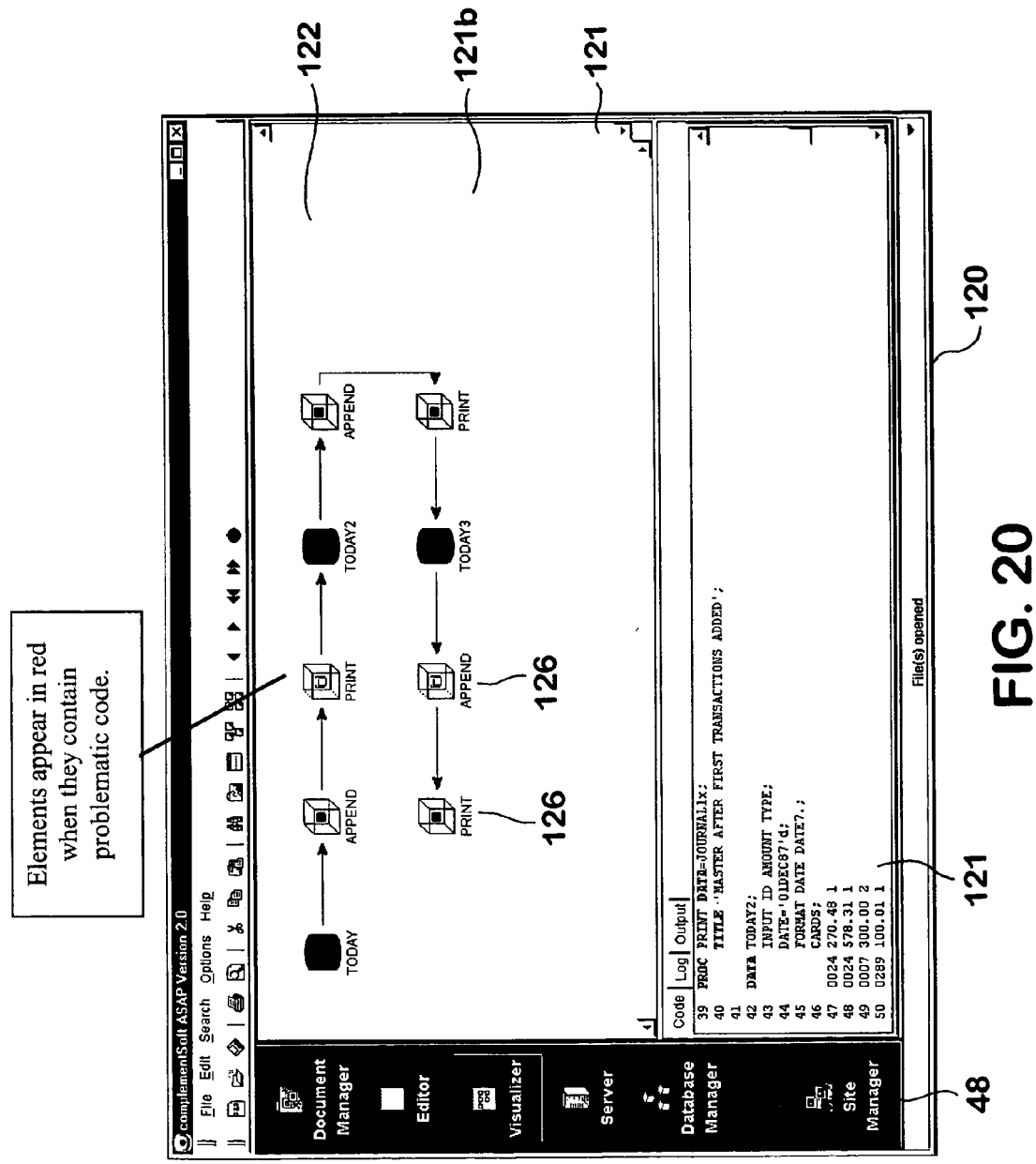
FIG. 20 is an exemplary screen shot depicting the visualizer with a problematic code section and a corresponding program flow icon being displayed in red.
Figure 20B:
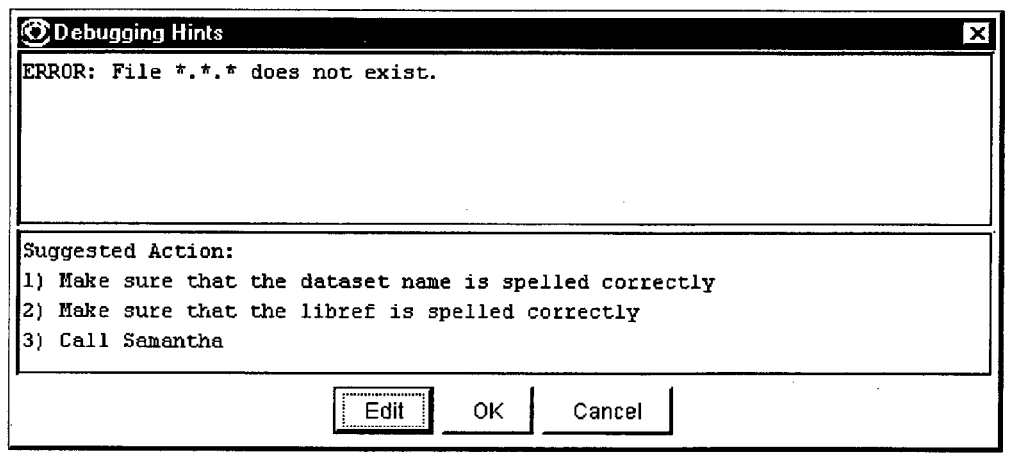
FIG. 20b is an exemplary screen shot depicting a debugging hint associated with a problematic code section.
Figure 20C:
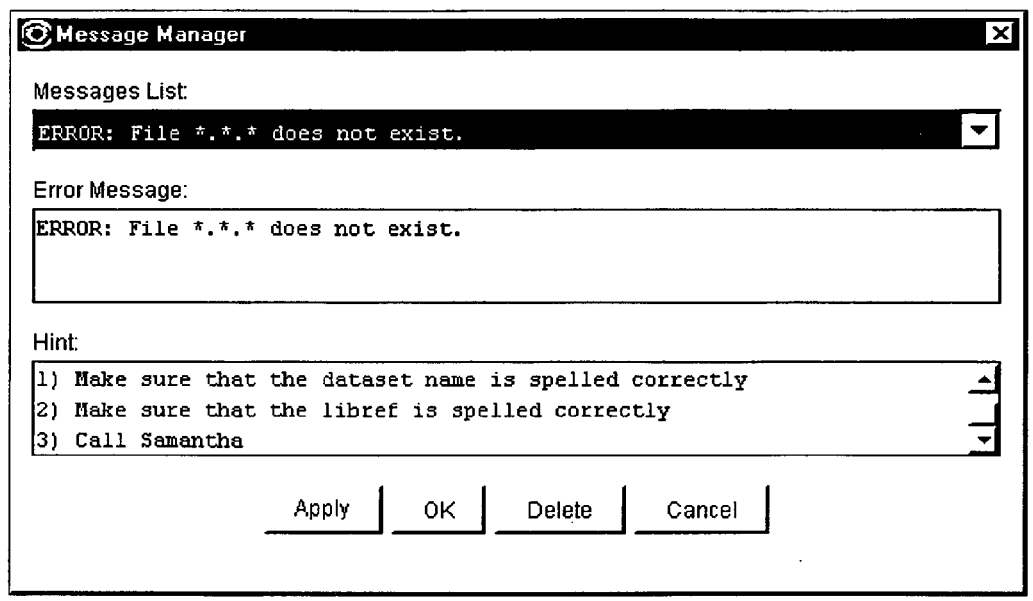
FIG. 20c is an exemplary screen shot depicting an error message and a corresponding debugging hint being provided by the message manager.

For example, as shown in FIG. 20, when elements appear in red, this signifies that the highlighted element contains an error in the underlying code. If the user selects the highlighted element, a pop-up window may be displayed to the user depicting the code associated with the highlighted element, along with the corresponding Error log, i.e., the editor 80 will scroll to the corresponding section of code and display the code to the user, while also displaying the Error log in close proximity to the code. It should be appreciated by those with skill in the art that during the user session, the user may freely navigate between the document manager 60, the editor 80 and the visualizer 120, as needed, by selecting the corresponding icon in the navigation bar 48.

It should also be understood that the user can visualize the execution log. Visualizing the execution log will show the exact path of the program flow 122 and data flow 124. The program flow 122 and the data flow 124 will be exact because they are based on the actual execution of the code. This in turns provides additional debugging and optimization information, such as, the code section that will get executed, how much data is being processed, the execution time for the code, the external files, library or macros that are referenced by the code, the format for the fully instantiated macro, etc.

For parsing the code, the document manager 60 first determines the file type for a selected file, i.e. the SAS®, SPSS®, SQL®, DB2 UDB®, Oracle® RDBMS etc. After the file type for a selected portion of code is determined, the parser layer 140 deploys the corresponding file parser 142, e.g., a file parser 142 that corresponds to, in this case, one of a variety of data manipulation and/or data management programming languages. By deploying the appropriate file parser 142, the parser layer 140 also activates the respective rules and logic that correspond to the detected programming language. Therefore, users are capable of developing, editing and maintaining code that can be executed by more than one data manipulation and/or data management program.

As mentioned earlier, the parser layer 140 is capable of processing varying file types, as the integrated software application 30 has been designed to be language aware. For example, as mentioned above, the document manager 60 recognizes file types and the integrated software application 30 includes enhanced, standalone productivity tools, such as, generic text editors, the Windows File Manager and File Transfer programs 68. In addition, these productivity tools are also designed to work seamlessly with the integrated software application 30 by implementing XML protocols, as is generally known in the art. Thus, although the preferred embodiment of the present invention is designed to interact with SAS® code, it should also be appreciated that the system will also be capable of parsing and interpreting other file types, such as, SPSS®, SQL®, DB2 UDB®, Oracle® RDBMS, etc.

Figure 21:
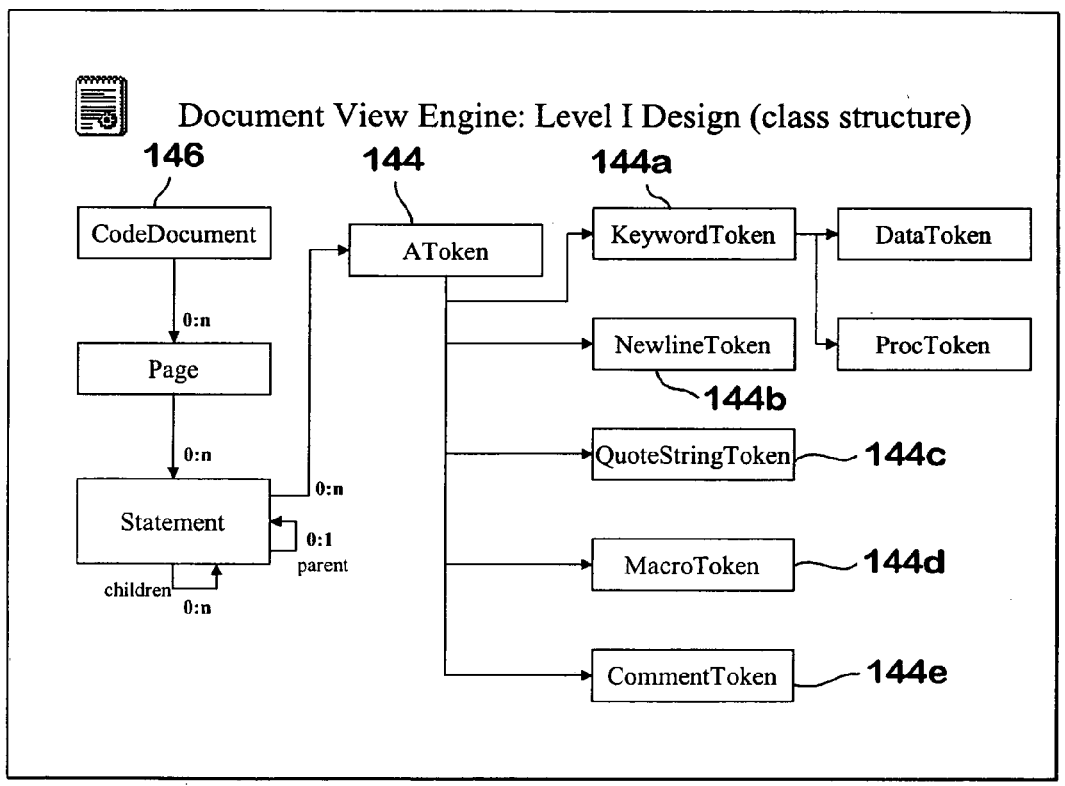
FIG. 21 depicts a predefined class structure for recognizing and displaying tokens, which is employed by a file parser to parse a selected file.
Figure 22:
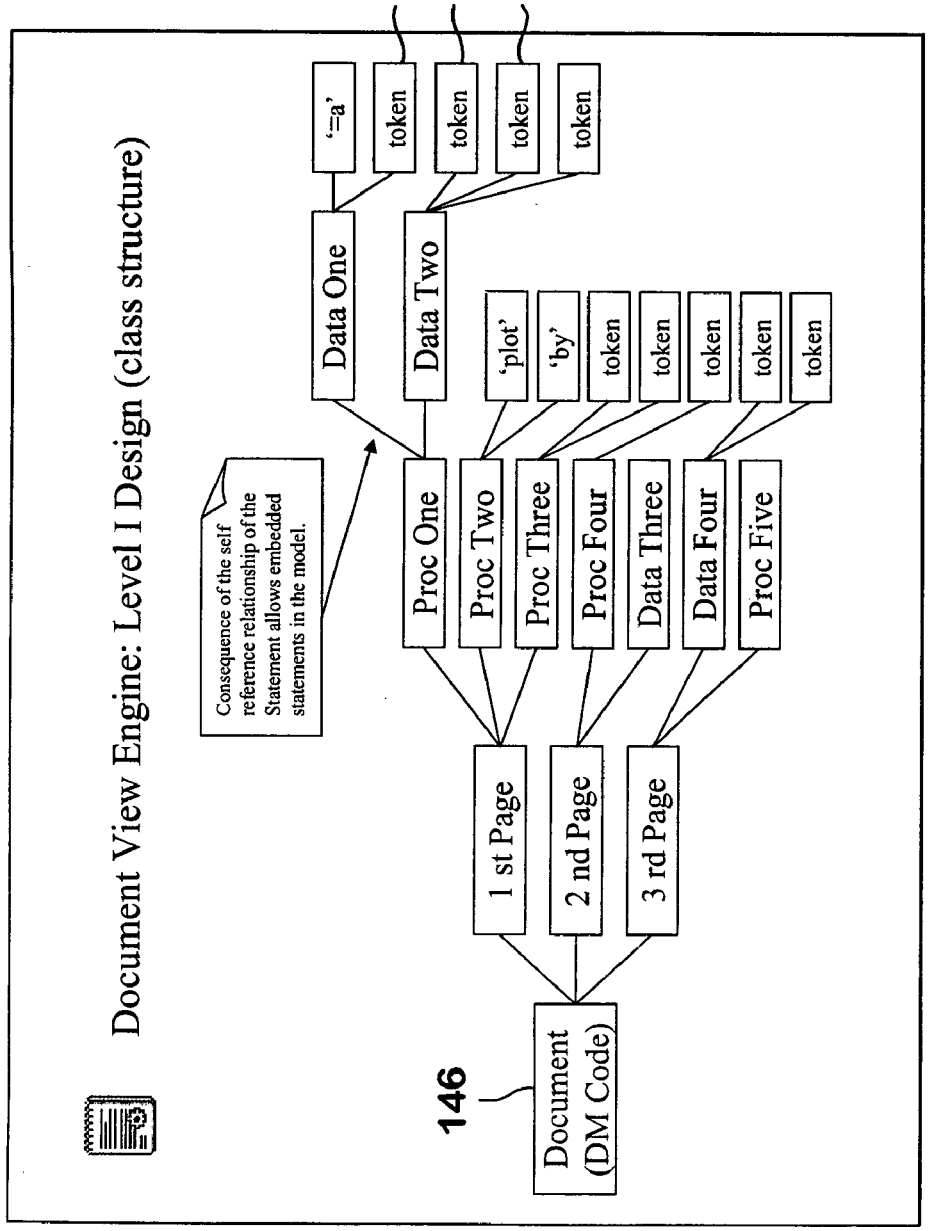
FIG. 22 depicts an exemplary file that has been parsed and the corresponding class structure of the parsed file.

As is generally known in the art, after the file parser 142 retrieves code from the document manager 60, the file parser 142 breaks the code document 146 into individual words/tokens 144. Based on the class of the individual tokens 144, the file parser 142 identifies and tags the tokens 144. Tokens 144 can be tagged to indicate that they are one of a variety of classes, such as, a keyword token 144*a*, a newline token 144*b*, a quotestring token 144*c*, a macro token 144*d* and a comment token 144*e*. By tagging the tokens 144, the parser layer 140 enables the document view engine 200 to recognize and display the program flow 122. As shown in FIG. 21, the document view engine 200 employs a predefined class structure for recognizing and displaying the tokens 144 provided by the file parser 142. An example of the class structure as it might be implemented in a parsed document/file is shown in FIG. 22.

While specific embodiments of the present invention have been described in detail, it will be appreciated by those skilled in the art that various modifications and alternatives to those details could be developed in light of the overall teachings of the disclosure. For example, the processes described with respect to computer executable instructions can be performed in hardware or software without departing from the spirit of the invention. Furthermore, the order of all steps disclosed in the figures and discussed above has been provided for exemplary purposes only. Therefore, it should be understood by those skilled in the art that these steps may be rearranged and altered without departing from the spirit of the present invention. In addition, it is to be understood that all patents discussed in this document are to be incorporated herein by reference in their entirety. Moreover, while the present invention may be described in terms of a particular programming language, it should also be understood that the present invention may be programmed in various other software languages. Accordingly, the particular arrangement disclosed is meant to be illustrative only and not limiting as to the scope of the invention which is to be given the full breadth of the appended claims and any equivalents thereof.

What is claimed is:

1. An integrated development environment, comprising:
   a document manager for retrieving source code programmed using one of a plurality of types of data manipulation languages;
   an editor for displaying the retrieved source code and providing a means for a user to edit the retrieved source code;
   a parser layer which detects the one of the plurality of types of data manipulation languages in which the retrieved source code is programmed and which activates rules and logic applicable to the detected one of the plurality of types of data manipulation languages; and
   a visualizer dynamically linked to the editor for displaying graphical representations of flows within the retrieved source code using the rules and logic applicable to the detected one of the plurality of types of data manipulation languages and activated by the parser, wherein the editor, parser layer and visualizer cooperate such that edits made to the source code using the editor are automatically reflected in the graphical representations of flows displayed by the visualizer and edits made to the graphical representations of flows in the visualizer are automatically reflected in the source code displayed by the editor.

2. The integrated development environment as recited in claim 1, wherein the graphical representations of flows depict data flows.

3. The integrated development environment as recited in claim 1, wherein the graphical representations of flows depict program flows.

4. The integrated development environment as recited in claim 1, wherein the graphical representations of data flows are expandable and collapsible.

5. The integrated development environment as recited in claim 1, wherein the document manager retrieves all files related to the source code to be edited.

6. The integrated development environment as recited in claim 1, wherein the document manager comprises a site manager and a connectivity layer for retrieving source code from one or more remote computers.

7. The integrated development environment as recited in claim 6, wherein the document manager comprises a security layer for managing secure connections with the one or more remote computers.

8. The integrated development environment as recited in claim 1, wherein the editor comprises a template manager for allowing preprogrammed segment of source code to be placed within the source code being edited.

9. The integrated development environment as recited in claim 8, wherein the template manager is adapted to automatically correct segments of the source code.

10. The integrated development environment as recited in claim 8, wherein the template manager is adapted to automatically generate segments of the source code.

11. The integrated development environment as recited in claim 1, further comprising a means for allowing the source code to be executed both locally and remotely.

12. The integrated development environment as recited in claim 11, wherein the parser layer further examines error log files generated by the means for allowing the source code to be executed to determine segments of the source code determined to include errors.

13. The integrated development environment as recited in claim 12, wherein the visualizer cooperates with the parser layer to change the appearance of displayed flows as a function of the source code segments determined to have errors.

14. The integrated development environment as recited in claim 12, wherein the editor cooperates with the parser layer to change the appearance of portions of the displayed source code as a function of the software segments determined to have errors.

15. The integrated development environment as recited in claim 12, further comprising a message manager cooperating with the parser layer for displaying debugging hints as a function of the source code segments determined to have errors.

16. The integrated development environment as recited in claim 15, wherein the message manager allows a user to edit and maintain debugging hints for a variety of different errors.

* * * * *